United States Patent
Shimazutsu et al.

[11] Patent Number: 6,151,791
[45] Date of Patent: Nov. 28, 2000

[54] METHOD FOR MEASURING ROLL PROFILE

[75] Inventors: Hiroaki Shimazutsu; Youichirou Tsumura; Kanji Hayashi; Koichi Takeno, all of Hiroshima, Japan

[73] Assignee: Mitsubishi Heavy Industries, Ltd., Tokyo, Japan

[21] Appl. No.: 09/272,166

[22] Filed: Mar. 18, 1999

[30] Foreign Application Priority Data

Mar. 20, 1998 [JP] Japan .................................. 10-072627
Jul. 8, 1998 [JP] Japan .................................. 10-192633

[51] Int. Cl.[7] .......................... G01B 21/20; G01B 21/30
[52] U.S. Cl. .................................. 33/552; 33/533
[58] Field of Search .......................... 33/533, 551, 552, 33/553, 554, 555

[56] References Cited

U.S. PATENT DOCUMENTS

| | | | |
|---|---|---|---|
| 3,895,446 | 7/1975 | Orlov et al. | 33/533 |
| 4,084,324 | 4/1978 | Whitehouse | 33/504 |
| 4,577,494 | 3/1986 | Jaeggi | 33/552 |
| 4,916,824 | 4/1990 | Shimazutsu et al. | 33/551 |
| 5,269,070 | 12/1993 | Thurston | 33/533 |
| 5,519,944 | 5/1996 | Delastre | 33/533 |

FOREIGN PATENT DOCUMENTS

| | | | |
|---|---|---|---|
| 61-286701 | 12/1986 | Japan | 33/552 |
| 615970B2 | 3/1994 | Japan . | |

*Primary Examiner*—G. Bradley Bennett

[57] ABSTRACT

A roll profile measuring method uses a displacement detector mount provided movably in a reciprocating manner along an axial direction of a work roll, and a displacement detector set of two displacement detectors mounted at a center distance $L_c$ from each other on the displacement detector mount for measuring irregularities in the surface of the work roll in the axial direction of the work roll. The roll profile measuring method comprises: measuring irregularities in the surface of the work roll over the total length of the work roll by moving the displacement detector mount in the axial direction of the work roll; and processing a data stream of composite measured values obtained on the basis of the difference between measured data provided by the displacement detectors to determine the surface profile of the work roll in the axial direction of the work roll.

8 Claims, 14 Drawing Sheets

METHOD FOR MEASURING ROLL PROFILE

BACKGROUND OF THE INVENTION

1. Field of the Invention

The present invention relates to a method for measuring a profile of a roll, and more particularly, to a method capable of measuring the profile of a roll in an in-line mode on a rolling mill for making a sheet, such as a hot rolling mill.

2. Description of the Related Art

It is generally known in a rolling mill for making a sheet, such as a hot rolling mill, that a work roll wears locally at its service face, which comes into contact with a workpiece to be rolled out. To obtain a sheet with a uniform distribution of thickness, therefore, the order of rolling workpieces must be controlled such that the workpieces must be passed along a rolling line in the order of decreasing width. However, this control on the order of rolling workpieces by their widths is a significant impediment to increased productivity. To eliminate the control on the order of rolling, a proposal has been made for so-called on-line roll grinding means. This type of grinding means grinds the service surface of a worn work roll to a desired configuration, with the work roll in an in-line state incorporated in a roll mill stand. The most important task in performing this work roll grinding is to monitor the profile of the work roll to be ground, before, after, and during the grinding operation.

A conventional method for measuring the profile of a roll is disclosed, for example, in Japanese Patent Publication No. 15970/94. The earlier technology will be described with reference to FIG. 14. In FIG. 14, the reference numeral 1 denotes a housing, and a work roll 2 is disposed in the housing 1. Below the work roll 2, a plurality of displacement detectors 3a to 3g are placed, and a displacement detector mount 4 is disposed for supporting these displacement detectors 3a to 3g. The displacement detector mount 4 is slidably engaged on a guide rail 6 attached to a support beam 5. The displacement detector mount 4 is adapted to move in the axial direction of the work roll 2 when a threaded shaft 7 is driven by a motor 8. The support beam 5 has opposite ends, in a longitudinal direction thereof, supported slidably on guides 9 of the housing 1, and is provided with a pair of positioning arms 10 projecting from a surface thereof facing the work roll 2. The opposite (lower) surface of the support beam 5 is joined to a pair of cylinders 11 attached to the housing 1 or a pedestal. The sliding surface of the guide rail 6 is held nearly parallel to the axial direction of the work roll 2 when the cylinders 11 press the support beam 5 against the lateral ends of the work roll 2 via the positioning arms 10. The reference numerals 12a to 12e denote displacement detector support tubes, which bear the displacement detectors 3a, 3b, (3c, 3d, 3e), 3f and 3g, respectively, and are movable toward and away from the work roll 2. The displacement detectors 3a to 3g are disposed opposite and facing the surface of the work roll 2 and nearly perpendicularly to the axis of the work roll 2 to measure surface irregularities of the work roll 2. During a measuring operation, the displacement detectors 3a to 3g are jutted toward the work roll 2 by a predetermined distance by means of the support tubes 12a to 12e.

According to the earlier technology constituted as described above, the support beam 5 is brought into pressed contact with the surface of the work roll 2 through the positioning arms 10 by the cylinders 11. In this state, the displacement detector mount 4 is moved in the axial direction of the work roll 2, so that the profile of the work roll 2 can be measured by the displacement detectors 3a to 3g. This profile measuring method of the earlier technology, however, has the following problems:

First, the guide rail 6 must extend straight and nearly parallel to the axial direction of the work roll 2 for the measuring operation. However, if the guide rail 6 deforms or waves, the amount of its deformation or waving is added to the measured data provided by the displacement detectors 3a to 3g. Thus, the true surface irregularities of the work roll 2 cannot be measured. Particularly when the above-described measuring method is applied to a hot rolling mill, the guide rail 6 thermally deforms under the influence of heat during rolling, thus making it difficult to measure irregularities of the roll surface with high accuracy.

The second problem is encountered when carrying out the above profile measuring method during hot rolling work (i.e., when it is designed to measure the surface of the work roll 2 at positions on a generator of the roll barrel on the basis of a pulse signal synchronous with the rotation of the work roll 2). In this case, not only errors due to the deformation or waving of the guide rail 6, but also excessive play between roll bearing housings (not shown) and the housing 1, excessive play between roll bearings (not shown) and roll journals (not shown), and the whirling motion of the work roll 2 due to the eccentric rotation of a backup roll are added to the measured values provided by the displacement detectors 3a to 3g. Thus, the true surface irregularities of the work roll 2 cannot be measured. That is, the measured values, provided by the displacement detectors 3a to 3g, include the true values of irregularities in the surface of the work roll 2, errors caused by errors in the motion of the displacement detector mount 4, and errors in the rotation of the work roll 2 during measurement.

In an attempt to solve these problems, Japanese Patent Publication No. 15970/94 discloses a high accuracy, roll profile measuring method achieved by using a processing procedure to be described in detail below. The earlier technology of this publication will be described with reference to FIG. 3. FIG. 3 is an excerpt from FIG. 14 (3c, 3d, 3e and 12c).

In FIG. 3, $L_b$ and $L_a$ represent the center distances between the displacement detectors 3c and 3d and between the displacement detectors 3d and 3e, respectively. x represents the abscissa of the position of the displacement detector mount 4 that has moved in the axial direction of the work roll 2, m(x) represents the profile of the work roll 2, $e_z(x)$ represents a relative translational motion error component caused by the relative translation of the displacement detector support tube 12c and the work roll 2 due to errors caused by the movement of the displacement detector mount 4 and the rotation of the work roll 2, and $e_p(x)$ represents a relative pitching motion error component attributed to similar causes.

Outline of Processing Procedure (i) Let the roll profile, translational motion error, and pitching motion error at a position at a moving distance $x_n$ from a measurement starting position be $m(x_n)$, $e_z(x_n)$ and $e_p(x_n)$, respectively. Measured values $y_{3c}(x_n)$, $y_{3d}(x_n)$ and $y_{3e}(X_n)$ provided by the displacement detectors 3c, 3d and 3e, respectively, are expressed by:

$$y_{3c}(x_n)=m(x_n-L_b)-e_z(x_n)-L_b \cdot e_p(x_n)$$
$$y_{3d}(x_n)=m(x_n)-e_z(x_n)$$
$$y_{3e}(x_n)=m(x_n+L_a)-e_z(x_n)+L_a \cdot e_p(x_n) \qquad (1)$$

(ii) Measured values $y_{3c}(x_n)$, $y_{3d}(x_n)$ and $y_{3e}(x_n)$ (n=0, 1, 2, ..., N−1) provided by the displacement detectors 3c, 3d and 3e are weighted and added as in Equation (2) to obtain a composite measured value $Y(x_n)$ not affected by the motion errors $e_z(x_n)$ and $e_p(x_n)$ (i.e., data in which the terms concerning the motion errors $e_z(x_n)$ and $e_p(x_n)$ have been eliminated)

$$Y(x_n) = y_{3d}(x_n) - L_b/(L_a+L_b) \cdot y_{3e}(x_n) - L_a / \quad (2)$$

$$(L_a + L_b) \cdot y_{3c}(x_n)$$

$$= m(x_n) - L_b/(L_a+L_b) \cdot m(x_n+L_a) - L_a /$$

$$(L_a + L_b) \cdot m(x_n - L_b)$$

(iii) A stream of composite measured data $Y(x_n)$ (n=0, 1, 2, ..., N−1) is subjected to Fourier transformation by using Equation (3) to obtain a roll profile $m(x_n)$ (n=0, 1, 2, ..., N−1). (Hereinafter, a method of measuring the roll profile $m(x_n)$ by using Equation (3) will be referred to as "the three-point method".)

$$m(x_n) = \sum_{K=0}^{N-1} \frac{1}{f_k}\left[(F_k \cdot \cos\delta_k - G_l \cdot \sin\delta_k) \cdot \cos 2\pi \frac{Kx_n}{L} + \right. \quad (3)$$

$$\left. (F_k \cdot \sin\delta_k + G_k \cdot \cos\delta_k) \cdot \sin 2\pi \frac{Kx_n}{L}\right]$$

where $F_k$: Kth order coefficient of the cosine component of an expression obtained by the Fourier transformation of the data stream $Y(x_n)$ $G_k$: Kth order coefficient of the sine component of an expression obtained by the Fourier transformation of the data stream $Y(x_n)$ $$f_k : \sqrt{[(1+a\cdot\cos K\alpha+b\cdot\cos K\beta)^2 + (a\cdot\sin K\alpha - b\cdot\sin K\beta)^2]}$$

$\delta_k$: $\tan^{-1}\{a\cdot\sin K\alpha - b\cdot\sin K\beta)/(1+a\cdot\cos K\alpha+b\cdot\cos K\beta)\}$ $\alpha$: $2\pi L_a/L$ $\beta$: $2\pi L_b/L$ L: Measured length of an object to be measured a: $-L_b/(L_a+L_b)$ b: $-L_a/(L_a+L_b)$ (iv) From Equations (3) and (1), the errors $e_z(x_n)$ and $e_p(x_n)$, at the time of measurement, are calculated.

(v) The measured data at the displacement detectors 3a, 3b, 3d, 3f and 3g are corrected with the errors $e_z(x_n)$ and $e_p(x_n)$ to obtain the ideal measured values free from motion errors (i.e., the true fractional roll profiles). These corrected measured values are combined to obtain the entire roll profile.

The roll profile measuring method disclosed in Japanese Patent Publication No. 15970/94 eliminates the effect of the errors $e_z(x_n)$ and $e_p(x_n)$. Thus, this method is suitable for achieving accurate measurement by using, for example, the displacement detector mount 4 in an actual rolling mill that is difficult to move with high accuracy. However, this method still has the following problems:

According to the three-point method, with an increase in the moving distance L of the displacement detector mount 4 during roll profile measurement, shape evaluation errors of low K orders, such as first order and second order, in Equation (3) tend to occur. This drawback will be outlined below.

As shown in Equation (3), when determining the roll profile $m(x_n)$ (its Kth order component), a multiplication using a constant $1/f_k$ specific to the measuring system is executed. Generally, the measured data $y_{3c}(X_n)$, $y_{3d}(X_n)$, and $y_{3e}(X_n)$ at the displacement detectors 3c, 3d, and 3e include a measurement noise, and the coefficients $F_k$ and $G_k$ obtained by the Fourier transformation of the composite measured data stream $Y(x_n)$ (n=0, 1, 2, ..., N−1) also include evaluation errors $\Delta F_k$ and $\Delta G_k$, respectively. Accordingly, in the roll profile $m(x_n)$ (its Kth order component), the evaluation errors $\Delta F_k$ and $\Delta G_k$ are multiplied by $1/f_k$, thus exerting influence. Suppose, here, that $L_a=L_b$ for simplicity. Then, from Equation (3), the value of $1/f_k$ for low-order modes (i.e., modes in which K takes a small value such as 1 or 2) can be approximately expressed by Equation (4):

$$1/f_k \approx 2/(2\pi K)^2 \cdot (L/L_a)^2 \quad (4)$$

Table 1 shows the values of $f_k$ when $L_a=L_b=22$ mm and L=1024 mm by way of example. As is obvious from Table 1, when the evaluation error $\Delta G_1=1$ occurs, the first order sine component of the roll profile $m(x_n)$ includes an error of $1/0.0091 \approx 110$.

TABLE 1

Value of $f_k$ (K = 1 to 100) ($L_a = L_b = 22$ mm, L = 1024 mm)

|    | 1 | 2 | 3 | 4 | 5 | 6 | 7 | 8 | 9 | 10 |
|----|---|---|---|---|---|---|---|---|---|----|
| 0  | .00910 | .03622 | .08089 | .14227 | .21926 | .31046 | .41420 | .52860 | .65158 | .78090 |
| 10 | .91420 | 1.04907 | 1.18304 | 1.31368 | 1.43862 | 1.55557 | 1.66242 | 1.75721 | 1.83822 | 1.90399 |
| 20 | 1.95331 | 1.98528 | 1.99932 | 1.99518 | 1.97294 | 1.93299 | 1.87607 | 1.80321 | 1.71573 | 1.61523 |
| 30 | 1.50354 | 1.38268 | 1.25487 | 1.12241 | .98773 | .85327 | .72148 | .59476 | .47541 | .36561 |
| 40 | .26735 | .18242 | .11236 | .05846 | .02168 | .00271 | .00188 | .01921 | .05439 | .10677 |
| 50 | .17541 | .25905 | .35617 | .46500 | .58357 | .70971 | .84114 | .97546 | 1.11022 | 1.24298 |
| 60 | 1.37131 | 1.49290 | 1.60551 | 1.70711 | 1.79584 | 1.87009 | 1.92851 | 1.97003 | 1.99391 | 1.99970 |
| 70 | 1.98730 | 1.95694 | 1.90917 | 1.84485 | 1.76517 | 1.67156 | 1.56573 | 1.44961 | 1.32531 | 1.19509 |
| 80 | 1.06132 | .92643 | .79288 | .66311 | .53946 | .42419 | .31939 | .22699 | .14864 | .08579 |
| 90 | .03957 | .01082 | .00008 | .00752 | .03303 | .07612 | .13603 | .21166 | .30163 | .40431 |

The present invention has been made in an attempt to solve the above-described problems with the earlier technology. It is an object of the present invention to provide a method for measuring a roll profile with high accuracy by suppressing the occurrence of shape evaluation errors of low-order modes.

Another object of the present invention is to provide a method for measuring a roll profile with high accuracy by suppressing the occurrence of shape evaluation errors of not only low-order modes but also high-order modes.

Still another object of the present invention is to provide a method for measuring a roll profile with high accuracy by decreasing measurement noise related to shape evaluation errors of low-order modes while eliminating motion errors during the measurement of the roll profile.

A further object of the present invention is to provide a roll profile measuring method capable of measuring the profile of a long roll with high accuracy and efficiently.

SUMMARY OF THE INVENTION

According to a first aspect of the present invention, there is provided a roll profile measuring method using a displacement detector mount provided movably in a reciprocating manner along an axial direction of a work roll, and a set of two displacement detectors arranged at a center distance $L_c$ on the displacement detector mount for measuring surface irregularities of the work roll in the axial direction thereof; the method comprising the steps of: measuring the surface irregularities of the work roll over the total length of the work roll by moving the displacement detector mount in the axial direction of the work roll; and processing a data stream of composite measured values calculated from differences between measured values obtained by the displacement detectors to determine the surface irregularities of the work roll in the axial direction thereof.

According to a second aspect of the present invention, there is provided a roll profile measuring method using a displacement detector mount provided movably in a reciprocating manner along an axial direction of a work roll, a plurality of displacement detectors for profile measurement arranged on the displacement detector mount for measuring irregularities in a plurality of fractions of a surface of the work roll in the axial direction of the work roll, and a plurality of sets of displacement detectors for motion error measurement arranged on the displacement detector mount, each set including three displacement detectors arranged at center distances $L_a$ and $L_b$ in the axial direction of the work roll for measuring a motion error of the displacement detector mount and an error in the rotation of the work roll; the method comprising the steps of: measuring irregularities in fractions of the surface of the work roll by the displacement detectors for profile measurement and the displacement detectors for motion error measurement by moving the displacement detector mount in the axial direction of the work roll; processing measured values provided by the displacement detectors for motion error measurement to determine a motion error caused by the movement of the displacement detector mount and in the rotation of the work roll; subtracting the determined motion error from the measured values provided by the displacement detectors for profile measurement to correct the measured values; and combining the corrected measured values of irregularities in the fractions of the surface of the work roll to obtain surface irregularities in the axial direction of the work roll over the total length of the work roll, wherein when grasping the motion error by processing data provided by the displacement detectors for motion error measurement, two roll profile measuring systems are constructed from a combination of two sets of displacement detectors arranged at a center distance $L_a+L_b$ and a center distance $L_b$, respectively, by the use of the set of the three displacement detectors for motion error measurement, and either of the profile measuring systems which is unsusceptible to measurement noise is used selectively for components of each order.

According to a third aspect of the present invention, there is provided a roll profile measuring method using a displacement detector mount provided movably in a reciprocating manner along an axial direction of a work roll, and a set of three displacement detectors arranged on the displacement detector mount at equal center distances $L_d$ to measure surface irregularities in the axial direction of the work roll; the method comprising the steps of: measuring irregularities in the surface of the work roll over the total length of the work roll by moving the displacement detector mount in the axial direction of the work roll; weighting measured values at the set of three displacement detectors by use of a factor dependent on the center distance $L_d$ and adding the weighted measured values together to obtain a data stream of composite measured values relating to the derivative of second order of the profile of the work roll; multiplying the data stream of composite measured values by a factor dependent on a sampling pitch for measuring the surface irregularities of the work roll, and subjecting the data stream of composite measured values multiplied by the factor to numerical integration once to obtain a new data stream of composite measured values relating to the derivative of first order of the profile of the work roll; and processing the new data stream of composite measured values to determine the profile of the work roll.

According to a fourth aspect of the present invention, there is provided a roll profile measuring method using a displacement detector mount provided movably in a reciprocating manner along an axial direction of a work roll, and a plurality of displacement detector sets arranged on the displacement detector mount at a distance 1 from one another set for measuring irregularities in a plurality of fractions of a surface of the work roll in the axial direction of the work roll, each set consisting of two displacement detectors spaced a center distance $L_c$ apart from each other; the method comprising the steps of: measuring irregularities in the fractions of the surface of the work roll by moving the displacement detector mount in the axial direction of the work roll; carrying out the roll profile measuring method according to the first aspect of the present invention for each set of the two displacement detectors to determine a plurality of fractional roll profiles, a measured length of each of the fractional roll profiles being greater than the distance between the adjacent sets of two displacement detectors each in order that the plurality of fractional roll profiles overlap each other; and combining the plurality of fractional roll profiles by using overlaps of the plurality of fractional roll profiles to obtain a roll profile over the total length of the work roll.

According to a fifth aspect of the present invention, there is provided a roll profile measuring method comprising the steps of: providing a mount movably in an axial direction of a work roll; bearing a first displacement detector, a second displacement detector, and a third displacement detector on the mount at predetermined center distances in the axial direction of the work roll; measuring data on irregularities in the axial direction of the work roll, including the effect of a translational motion error and a pitching motion error during the movement of the mount, by the first, second and third displacement detectors by moving the mount in the axial direction of the work roll; with a combination of the first and second displacement detectors being used as a first displacement detector set, and a combination of the first and third displacement detectors being used as a second displacement detector set, processing two sets of data on irregularities in the axial direction of the work roll, including the effect of the pitching motion error during the movement of the mount, on the basis of the data on irregularities in the axial direction of the work roll corresponding to the first and second displacement detector sets; calculating the pitching motion error during the movement of the mount on the basis of a shape defined by the two sets of irregularity data in the axial direction of the work roll; correcting the irregularity data in the axial direction of the work roll, provided by the three displacement detectors, by using the pitching motion error to obtain a stream of irregularity data in the axial direction of the work roll free from the effect of the pitching motion error; and determining the irregularities in the axial direction of the work roll on the basis of the stream of irregularity data.

Thus, the present invention can provide a highly accurate method for measuring a roll profile by suppressing shape evaluation errors of low orders.

The present invention can also provide a highly accurate method for measuring a roll profile by suppressing not only shape evaluation errors of low orders, but also shape evaluation errors of high orders.

The present invention can further provide a roll profile measuring method capable of suppressing the occurrence of measurement noise while suppressing motion errors during measurement.

Furthermore, the present invention can provide a roll profile measuring method capable of measuring the profile of a long roll with high accuracy and efficiently.

Besides, the present invention can measure the profile of a roll with high accuracy even under conditions involving a large component of a pitching motion error.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
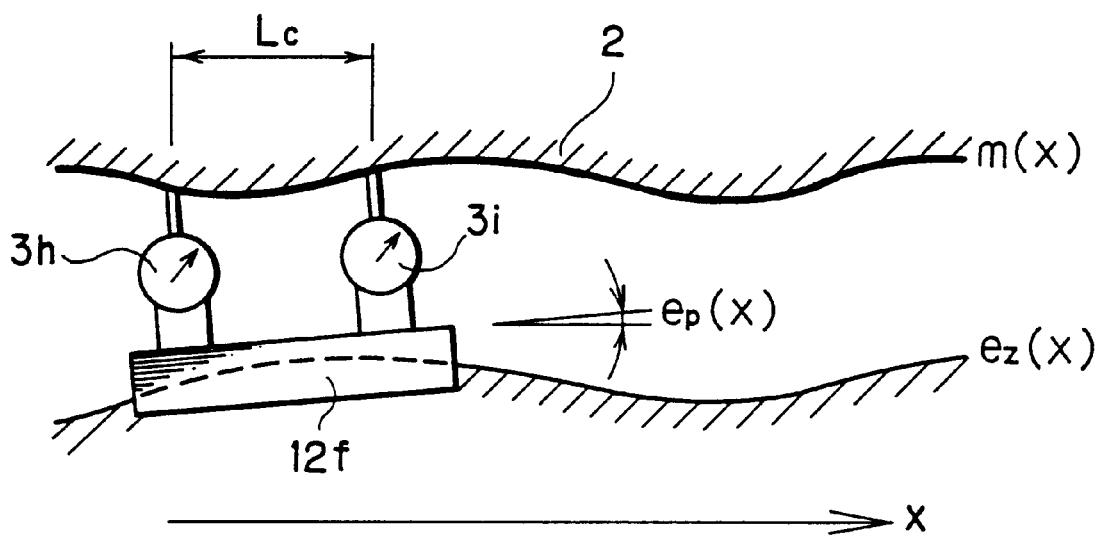
FIG. 1 is a constitutional view of a roll profile measuring system for carrying out a roll profile measuring method in a first embodiment according to the present invention.

Preferred embodiments of the present invention will now be described in detail with reference to FIGS. 1 to 14. In FIGS. 1 to 10, the same members, as in the earlier technology, are designated by the same reference numerals or symbols, and the description thereof will be omitted to avoid duplication.

A first embodiment of the present invention will be described with reference to FIG. 1. FIG. 1 shows a profile measuring method relying on two displacement detectors borne at a distance L, on a movable carriage, which is driven for movement along a guide surface provided nearly parallel to an object to be measured. FIG. 1 will be the same as FIG. 3, provided that only displacement detectors 3h and 3i are mounted.

Figure 14:
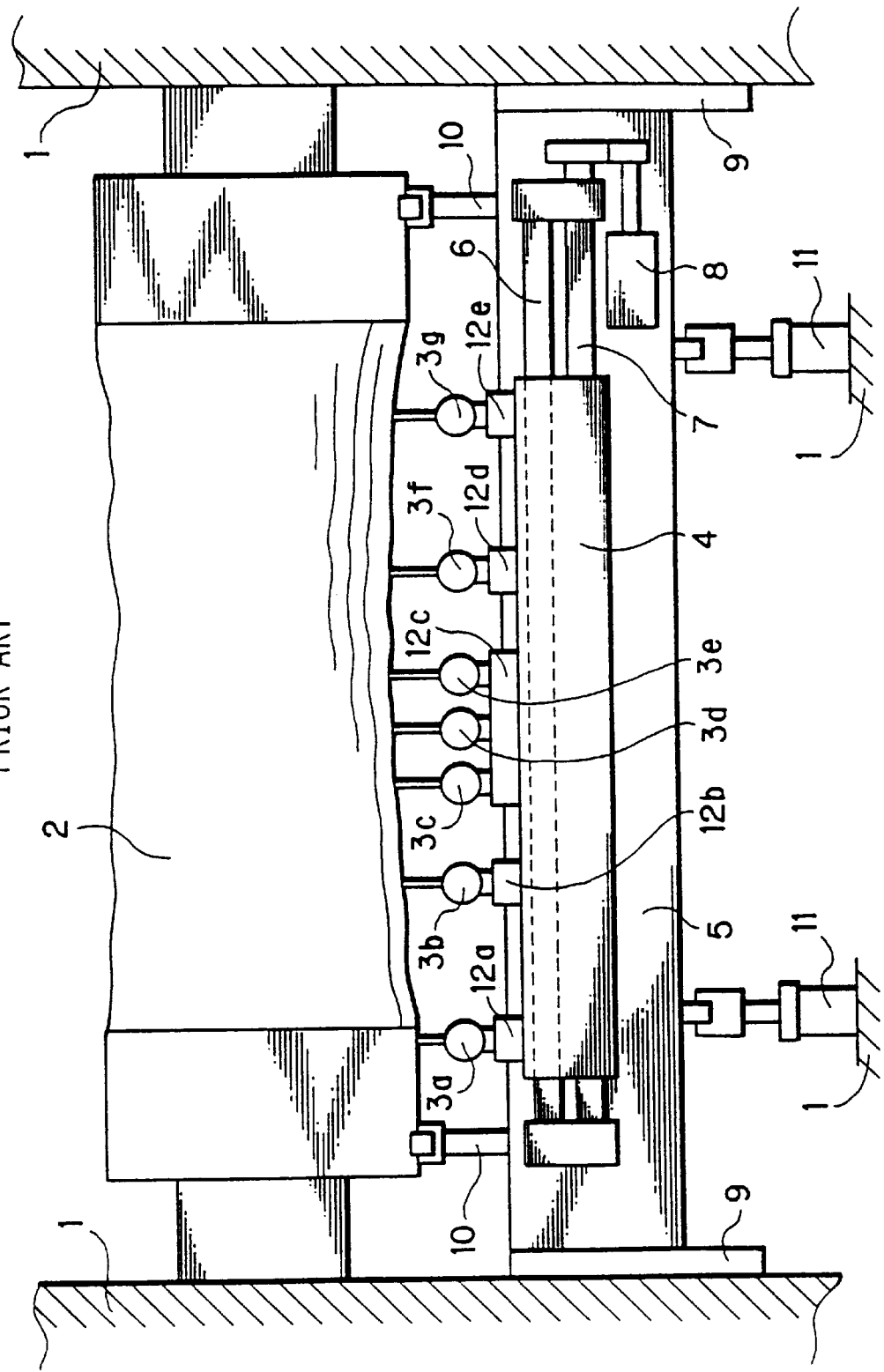
FIG. 14 is a constitutional view of a roll profile measuring system for carrying out a roll profile measuring method.

As shown in FIG. 1, the displacement detectors 3h and 3i having the same function as that of the displacement detectors 3a to 3g shown in FIG. 14 are provided. Also, a displacement detector support tube 12f, having the same function as that of the displacement detector support tubes 12a to 12e shown in FIG. 14, is provided. Like FIG. 3, m(x) is the profile of a work roll 2, $e_z(x)$ is a translational motion error caused by the translation of the displacement detector support tube 12f relative to the work roll 2, and $e_p(x)$ is a pitching motion error caused by the pitching of the displacement detector support tube 12f relative to the work roll 2.

Figure 3:
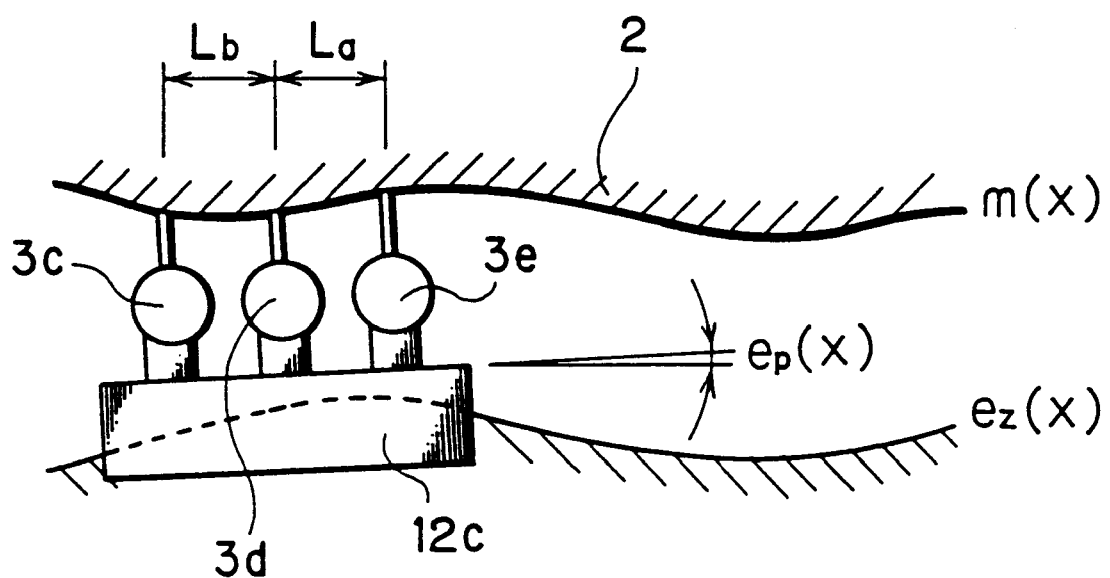
FIG. 3 is a schematic view showing the measurement of motion errors caused by a displacement detector mount when carrying out a roll profile measuring method.

As with measurement using a drive system shown in FIG. 3, the two displacement detectors 3h and 3i are moved along an axial direction of the work roll 2. Simultaneously, the displacement detectors 3h and 3i measure surface irregularities of the work roll 2 at sampling positions arranged at predetermined data sampling pitches. The obtained data is processed by the following procedure to determine the profile of the work roll 2:

(1) Measured data at the displacement detectors 3h and 3i

Measured values $y_{3h}(x_n)$ and $y_{3i}(x_n)$ measured by the displacement detectors 3h and 3i at a position $x_n$ in the axial direction of the work roll 2 are expressed by Equation (5):

$$y_{3h}(x_n) = m(x_n) - e_z(x_n)$$

$$y_{3i}(x_n) = m(x_n + L_c) - e_z(x_n) + L_c \cdot e_p(x_n) \quad (5)$$

(2) Calculation of composite measured value $Y_{3h3i}(x_n)$

A composite measured value $Y_{3h3i}(x_n)$ defined as a difference between the measured values $y_{3h}(x_n)$ and $y_{3i}(X_n)$ is calculated as follows:

$$Y_{3h3i}(x_n) = y_{3i}(x_n) - y_{3h}(x_n) \quad (6)$$

-continued $$= m(x_n + L_c) - m(x_n) + L_c \cdot e_p(x_n)$$

As is obvious from Equation (6), the composite measured value $Y_{3h3i}(x_n)$ does not have the terms relating to $e_z(x_n)$ as a result of offsetting. Generally, $e_p(x_n)$ in Equation (6) is so small that the Equation (6) can be approximated by Equation (7).

$$Y_{3h3i}(x_n) \approx m(x_n + L_c) - m(x_n) \tag{7}$$

It is known from Equation (7) that the composite measured value $Y_{3h3i}(x_n)$ is approximately equal to the superposition of the profile $m(x_n)$ to be measured and the profile $m(x_n)$ phase changed by $L_c$, i.e., $m(x_n + L_c)$ (3) Regeneration of roll profile $m(x_n)$ The roll profile $m(x_n)$ (n=0, 1, 2, . . . , N−1) can be regenerated from a data stream of composite measured values $Y_{3h3i}(x_n)$ (n=0, 1, 2, . . . , N−1) by Fourier transformation. The roll profile $m(x_n)$ can be expressed as the sum of Fourier series as in Equation (8).

$$m(x_n) = \sum_{K=0}^{N-1} C_k \cdot \cos\left(\frac{2\pi K x_n}{L} + \phi_k\right) \tag{8}$$

where L is the length of roll profile measurement, $C_k$ is the amplitude of a shape component of Kth order of $m(x_n)$, and $\phi_k$ is a phase difference of the component of Kth order.

Substituting Equation (8) into Equation (7), followed by rearrangement, gives Equation (9).

$$Y_{3h3i}(x_n) = \sum_{K=0}^{N-1} \left[ C_k \cdot \cos\left(\frac{2\pi K(x_n + L_c)}{L} + \phi_k\right) - \right. \tag{9}$$

-continued $$\left. C_k \cdot \cos\left(\frac{2\pi K x_n}{L} + \phi_k\right) \right]$$

$$= \sum_{K=0}^{N-1} \left[ F'_k \cdot \cos 2\pi \frac{K x_n}{L} + G'_k \cdot \sin 2\pi \frac{K x_n}{L} \right]$$

where:

$$F'_k = C_k \cdot f_k \cdot (\cos \phi_k \cdot \cos \delta_k - \sin \phi_k \cdot \sin \delta_j)$$

$$G'_k = -C_k \cdot f_k \cdot (\sin \phi_k \cdot \cos \delta_k + \cos \phi_k \cdot \sin \delta_k)$$

$$f'_k = \sqrt{[(\cos K\beta - 1)^2 + (\sin K\beta)^2]}$$

$\delta_k' = \tan^{-1}\{\sin K\beta/(\cos K\beta - 1)\}$
$\beta' = 2\pi L_c/L$

From Equations (8) and (9), the roll profile $m(x_n)$ can be expressed by Equation (10):

$$m(x_n) = \sum_{K=0}^{N-1} \frac{1}{f'_k} \left[ (F'_k \cdot \cos\delta'_k - G'_k \cdot \sin\delta'_k) \cdot \cos 2\pi \frac{K x_n}{L} + \right. \tag{10}$$

$$\left. (F'_k \cdot \sin\delta'_k + G'_k \cdot \cos\delta'_k) \cdot \sin 2\pi \frac{K x_n}{L} \right]$$

Equation (10) is the same in form as Equation (3). Thus, the profile of the work roll 2 can be determined by using the data stream of composite measured values obtained on the basis of the measured data provided by the two displacement detectors 3h and 3i. (The profile measuring method of determining the roll profile $m(x_n)$ using Equation (10) will be referred to hereinafter as "the two-point method".)

Even with this method, shape evaluation errors of low orders occur as with the method in the earlier technology, owing to noise incorporated into the measured data obtained by the displacement detectors. However, the value of $1/f_k'$ does not increase sharply when L increases, because the relation between $f_k'$, and L and $L_c$ holds as in Equation (11)

$$\frac{1}{f'_k} \approx \frac{1}{2\pi K\left(\frac{L}{L_c}\right)} \tag{11}$$

By way of example, Table 2 shows the values of $f'_k$ for K=1 to 100 when $L_c=44$ mm and L=1024 mm.

TABLE 2

Values of $f'_k$ (K = 1 to 100) ($L_c$ = 44 mm, L = 1024 mm)

|    | 1       | 2       | 3       | 4       | 5       | 6       | 7       | 8       | 9       | 10      |
|----|---------|---------|---------|---------|---------|---------|---------|---------|---------|---------|
| 0  | .26916  | .53343  | .78798  | 1.02821 | 1.24972 | 1.44849 | 1.62091 | 1.76384 | 1.87468 | 1.95140 |
| 10 | 1.99263 | 1.99759 | 1.96621 | 1.89906 | 1.79735 | 1.66294 | 1.49827 | 1.30635 | 1.09065 | .85511  |
| 20 | .60401  | .34192  | .07361  | .19603  | .46212  | .71979  | .96437  | 1.19140 | 1.39675 | 1.57669 |
| 30 | 1.72795 | 1.84776 | 1.93395 | 1.98496 | 1.99985 | 1.97835 | 1.92086 | 1.82842 | 1.70271 | 1.54602 |
| 40 | 1.36120 | 1.15162 | .92108  | .67378  | .41422  | .14713  | .12264  | .39018  | .65062  | .89922  |
| 50 | 1.13146 | 1.34312 | 1.53034 | 1.68971 | 1.81834 | 1.91398 | 1.97460 | 1.99940 | 1.98781 | 1.94006 |
| 60 | 1.85701 | 1.74017 | 1.59167 | 1.41421 | 1.21102 | .98580  | .74263  | .48596  | .22044  | .04908  |
| 70 | .31772  | .58057  | .83286  | 1.07000 | 1.28766 | 1.48190 | 1.64918 | 1.78645 | 1.89122 | 1.96157 |
| 80 | 1.99624 | 1.99458 | 1.95663 | 1.88309 | 1.77528 | 1.63517 | 1.46531 | 1.26879 | 1.04918 | .81048  |
| 90 | .55704  | .29346  | .02454  | .24482  | .50973  | .76537  | 1.00708 | 1.23046 | 1.43146 | 1.60642 |

As is obvious from Table 2, the values of $f'_k$ for low-order modes (for small values of K) are greater than the corresponding values of $f_k$ tabulated in Table 1. This signifies that the two-point method of this embodiment is more effective than the conventional three-point method in suppressing shape evaluation errors for low-order modes.

That is, the two-point profile measuring method in the first embodiment suppresses shape evaluation errors for low-order modes to achieve highly accurate profile measurement.

Next, a second embodiment of the present invention will be described by reference to FIGS. 3 and 14. Comparison of the values of $f_k'$ in Table 2 and the values of $f_k$ in Table 1 in the aforementioned first embodiment shows that the values of $f_k'$ for the values of K in the range of 20 to 30 are smaller than the values of $f_k$. This means that shape evaluation errors for high-order modes are apt to develop. The values of $f_k''$ corresponding to those of $f_k'$ when $L_c=22$ mm in FIG. 1 are calculated as in Table 3 by using Equation (9) with $L_c=22$ mm.

and values for the measuring system comprising the combination (3c, 3e) are used for the range of K=32 to 62.

(v) Values of $e_z(x_n)$ and $e_p(x_n)$ are calculated by using the profile $m(x_n)$ obtained in (iv) and using Equation (1).

(vi) Measured data provided by the displacement detectors 3a, 3b, 3d, 3f, and 3g are corrected with the values $e_z(x_n)$ and $e_p(x_n)$ to determine ideal measured values free from any

TABLE 3

Values of $f_k''$ (K = 1 to 100) ($L_c$ = 22 mm, L = 1024 mm)

|    | 1       | 2       | 3       | 4       | 5       | 6       | 7       | 8       | 9       | 10      |
|----|---------|---------|---------|---------|---------|---------|---------|---------|---------|---------|
| 0  | .13488  | .26916  | .40220  | .53341  | .66220  | .78797  | .91015  | 1.02828 | 1.14154 | 1.24969 |
| 10 | 1.35216 | 1.44847 | 1.53818 | 1.62089 | 1.69622 | 1.76382 | 1.82339 | 1.87466 | 1.91739 | 1.95139 |
| 20 | 1.97651 | 1.99262 | 1.99966 | 1.99759 | 1.98643 | 1.96623 | 1.93707 | 1.89908 | 1.85245 | 1.79739 |
| 30 | 1.73414 | 1.66299 | 1.58428 | 1.49834 | 1.40559 | 1.30643 | 1.20133 | 1.09075 | .97521  | .85522  |
| 40 | .73134  | .60414  | .47418  | .34206  | .20838  | .07376  | .06120  | .19589  | .32968  | .46196  |
| 50 | .59215  | .71964  | .84385  | .96422  | 1.08020 | 1.19126 | 1.29689 | 1.39662 | 1.48999 | 1.57658 |
| 60 | 1.65598 | 1.72785 | 1.79185 | 1.84768 | 1.89511 | 1.93390 | 1.96389 | 1.98493 | 1.99694 | 1.99985 |
| 70 | 1.99366 | 1.97839 | 1.95410 | 1.92093 | 1.87900 | 1.82852 | 1.76971 | 1.70284 | 1.62822 | 1.54618 |
| 80 | 1.45710 | 1.36139 | 1.25948 | 1.15183 | 1.03894 | .92132  | .79950  | .67404  | .54551  | .41450  |
| 90 | .28160  | .14742  | .01256  | .12235  | .25670  | .38989  | .52130  | .65033  | .77641  | .89894  |

As seen from Tables 2 and 3, $f_k'>f_k''$ in the range of K=1 to 15, and $f_k'<f_k''$ in the range of K=16 to 31, showing that the effect of measurement noise is dependent on the center distance between the two displacement detectors for a fixed value of the roll profile measuring length L.

In light of the above findings, it is possible to provide a roll profile measuring method capable of suppressing shape evaluation errors for high-order modes as well as those for low-order modes. The configuration of a roll profile measuring system for carrying out such a roll profile measuring method is identical with that of the roll profile measuring system for carrying out the three-point method shown in FIGS. 14 and 3.

(i) Referring to FIG. 3, suppose that a combination of two displacement detectors (3c, 3d), and a combination of two displacement detectors (3c, 3e) carry out the two-point method. The two-point method by the combination (3c, 3d) corresponds to $L_c=L_b$ in FIG. 1, while the two-point method by the combination (3c, 3e) corresponds to $L_c=L_a+L_b$ in FIG. 1.

(ii) A data stream of composite measured values $Y_{3c3d}(x_n)$ and a data stream of composite measured values $Y_{3c3e}(x_n)$ (n=0, 1, 2 . . . , N−1) corresponding to the respective combinations of displacement detectors are determined, and Fourier coefficients $F_k'$, $G_k'$, $F_k''$ and $G_k''$ for these data streams are calculated.

(iii) Values $f_k'$ and $f_k''$ Of $f_k$ corresponding to the respective combinations of displacement detectors are calculated. When $L_a=L_b=22$ mm and L=1024 mm, for example, the values of $f_k''$ for the combination of displacement detectors (3c, 3d) are tabulated in Table 3, and those of $f_k'$ for the combination of displacement detectors (3c, 3e) are tabulated in Table 2.

(iv) When calculating the profile $m(x_n)$ from Equation (10), the respective values of $f_k'$ and $f_k''$ for each order K are compared. Based on the results, $F_k$, $G_k$, $f_k$, and $\delta_k$ for the measuring system including the combination of displacement detectors that present greater values are used to calculate the roll profile $m(x_n)$. For example, in the cases shown in Tables 2 and 3, values for the measuring system comprising the combination (3c, 3e) are used for the range of K=1 to 15, values for the measuring system comprising the combination (3c, 3d) are used for the range of K=16 to 31, motion errors (i.e., the true fractional roll profiles). These ideal measured values are combined to determine the entire roll profile.

As noted above, "the selective two-point method" in the present second embodiment can suppress the occurrence of shape evaluation errors in both low- and high-order modes, compared with "the fixed two-point method" in the first embodiment, and thus can achieve roll profile measurement with high accuracy. The present second embodiment has been described for cases where $L_c=22$ mm and $L_c=44$ mm. However, the value $L_c$ need not be limited thereto, but may be in any suitable range in which profile measurement is possible.

Figure 2:
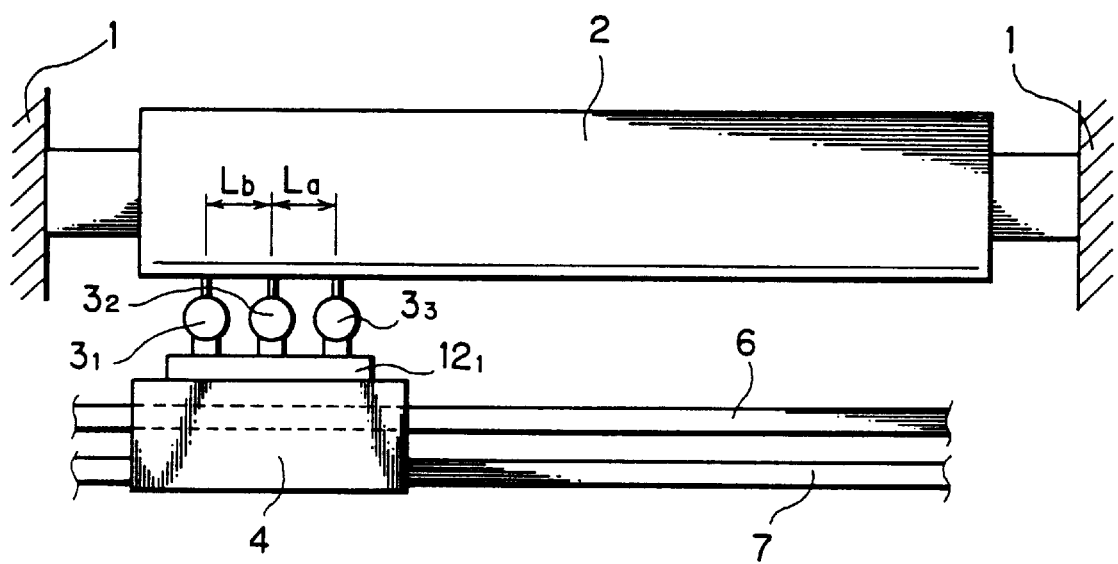
FIG. 2 is a constitutional view of a roll profile measuring system for carrying out roll profile measuring methods in a third and a fourth embodiment according to the present invention.

Next, a third embodiment of the present invention will be described with reference to FIG. 2. FIG. 2 schematically shows a roll profile measuring system for carrying out the roll profile measuring method in the third embodiment. In this drawing, members designated by the same numerals or symbols as in FIGS. 3 and 14 have the same function, and their description will be omitted.

The reference numerals $3_1$, $3_2$ and $3_3$ denote displacement detectors together constituting a displacement detector set, and the reference numeral $12_1$ denotes a displacement detector support tube. In FIG. 2, the displacement detectors $3_1$, $3_2$ and $3_3$ are placed at a center distance $L_a$ and a center distance $L_b$ in an axial direction of a work roll 2. A displacement detector mount 4 is driven for movement over the total length of the roll in the axial direction thereof to measure surface irregularities of the roll over its entire length at sampling positions arranged at predetermined sampling pitches.

A combination of the displacement detectors ($3_1$, $3_2$), and another combination of the displacement detectors ($3_1$, $3_3$) constitute two measuring systems, each of which performs "the two-point method". These measuring systems carry out the steps (i) to (iv) of the processing procedure in the aforementioned second embodiment to determine the roll profile $m(x_n)$.

As is easily understood from FIGS. 2 and 14, the profile measuring method in the present third embodiment moves the displacement detector mount 4 over a distance longer than in the second embodiment. However, the measuring method of the present embodiment has the advantage, characteristic of the two-point method, that shape evaluation errors of low-order modes tend to occur minimally, even if the roll profile measuring length L increases. Retaining this advantage, the method can determine the entire roll profile $m(x_n)$ directly merely by the action of the three displacement detectors.

Furthermore, a fourth embodiment of the present invention will be described by referring to FIG. 2 again. Upon comparison of Equations (2) and (7), the composite measured value expressed by Equation (2), which is obtained by the three-point method by eliminating the terms concerning the motion errors $e_z(x)$ and $e_p(x)$, can be expressed by Equation (12) when $L_a = L_b$.

$$Y(x_n) = m(x_n) - L_b / (L_a + L_b) \cdot m(x_n + L_a) -$$ (12)

$$L_a / (L_a + L_b) \cdot m(x_n - L_b)$$

$$= -L_b / (L_a + L_b) \cdot \{m(x_n + L_a) - m(x_n)\} +$$

$$L_a / (L_a + L_b) \cdot \{m(x_n) - m(x_n - L_b)\}$$

$$= -1/2[\{m(x_n + L_a) - m(x_n)\} - \{m(x_n) - m(x_n - L_b)\}]$$

The terms in the brackets ([ ]) in Equation (12) are a derivative of second order for the roll profile $m(x_n)$. Single numerical integration expressed by Equation (13), for example, gives a stream of data $Y^*(x_j)$ (j=0, 1, 2, ..., N-1) corresponding to the data stream of composite measured values expressed by Equation (7), which are obtained by the two-point method and serving as a derivative of first order for the roll profile $m(x_n)$:

$$Y^*(x_j) \equiv \sum_{K=0}^{j} (-2Y(x_n) \times P)$$ (13)

where P is a sampling pitch for data sampling by the displacement detectors. The data stream $Y^*(x_j)$ does not include the influence of the motion errors $e_z(x)$ and $e_p(x)$. The evaluation of roll profile without being affected by the motion errors $e_z(x)$ and $e_p(x)$ can be made by carrying out the two-point method using the data stream $Y^*(x_j)$ as a new data stream of composite measured values.

The foregoing description clarifies the following facts:

(1) The "three-point method" tends to cause shape evaluation errors in low-order modes when the roll profile measuring length L is large.

(2) The "two-point method" can suppress the occurrence of shape evaluation errors in low-order modes even for a large L, but is subject to the influence of the motion error $e_p(x)$.

(3) A data stream of composite measured values corresponding to that of the two-point method and unaffected by the motion errors $e_z(x)$ and $e_p(x)$ can be obtained by subjecting a data stream of composite measured values obtained by the three-point method to numerical integration expressed by Equation (13).

Based on these facts, the profile measuring method in the present fourth embodiment can suppress the occurrence of shape evaluation errors in low-order modes, while suppressing the motion errors during measurement, even if the displacement detector mount 4 needs to be moved over a long distance during roll profile measurement (i.e., even if the roll profile measuring length L is large). Thus, this method can achieve highly accurate roll profile measurement.

A roll profile measuring system for carrying out the roll profile measuring method in this fourth embodiment is the same as that for carrying out the roll profile measuring method in the third embodiment shown in FIG. 2, except that the displacement detectors $3_1$, $3_2$ and $3_3$ are arranged at equal center distances, i.e., $L_a = L_b = L_d$. Hence, the description of the roll profile measuring system for carrying out the fourth embodiment will be omitted.

A stream of measured data is processed by the following procedure to determine a roll profile $m(x_n)$ (i) Streams of measured data $y_{31}(x_n)$, $y_{32}(x_n)$, and $y_{33}(x_n)$ (n=0, 1, ..., N-1) provided by the three displacement detectors $3_1$, $3_2$, and $3_3$ are processed as in Equation (2) to obtain a stream of composite measured data $Y(x_n)$ (n=0, 1, 2, ..., N-1). In Equation (2), the stream of measured data are weighted on the condition that $L_a = L_b = L_d$.

(ii) The stream of measured data $Y(x_n)$ is subjected to single numerical integration expressed by Equation (13) to obtain a new stream of composite measured data $Y^*(x_n)$ (n=0, 1, 2, ..., N-1).

(iii) The new stream of composite measured data $Y^*(x_n)$ is processed by using Equation (10) for the two-point method to determine a roll profile $m(x_n)$, with $L_c = L_d$ in Equation (10).

In the foregoing operations, the motion errors $e_z(x)$ and $e_p(x)$ during measurement are eliminated in the step (i). Thus, the roll profile measuring method in the present fourth embodiment can achieve roll profile measurement by utilizing both of the feature of the three-point method (i.e., freedom from the influence of the motion errors $e_z(x)$ and $e_p(x)$ ), and the feature of the two-point method (i.e., suppression of the occurrence of shape evaluation errors in low-order modes due to measurement noise).

Figure 4:
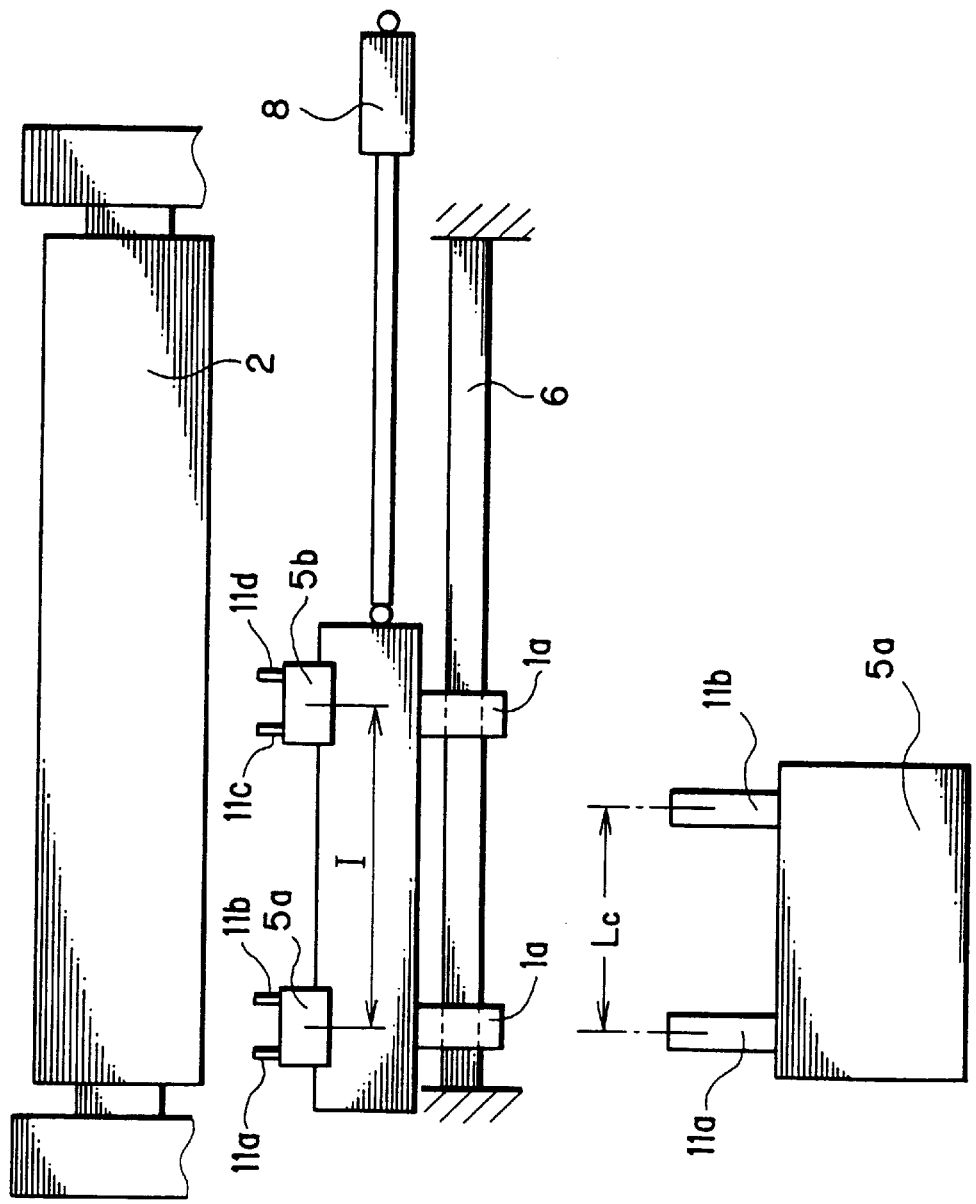
FIG. 4 is a constitutional view of a roll profile measuring system for carrying out a roll profile measuring method in a fifth embodiment according to the present invention.

A fifth embodiment of the present invention will be described with reference to FIGS. 4 to 7. FIG. 4 shows a combination of two displacement detectors 11a and 11b supported on a displacement detector support tube 5a, and a combination of two displacement detectors 11c and 11d supported on a displacement detector support tube 5b. These combinations of displacement detectors can measure the entire profile of a work roll 2, divided into two fractional profiles, by the two-point method described in the first embodiment. Let the distance between the displacement detector support tubes 5a and 5b be l, and a measuring length of each fractional profile be L (the same value as the amount of movement of a displacement detector mount 1 during roll profile measurement). Here, the conditions for the measurement system are set such that the relation l<L holds. Under these conditions, overlapping portions of the measured fractional profiles are used to combine the fractional profiles, thus grasping the entire roll profile. The outline of this mechanism will be described by reference to FIG. 5.

Figure 5:
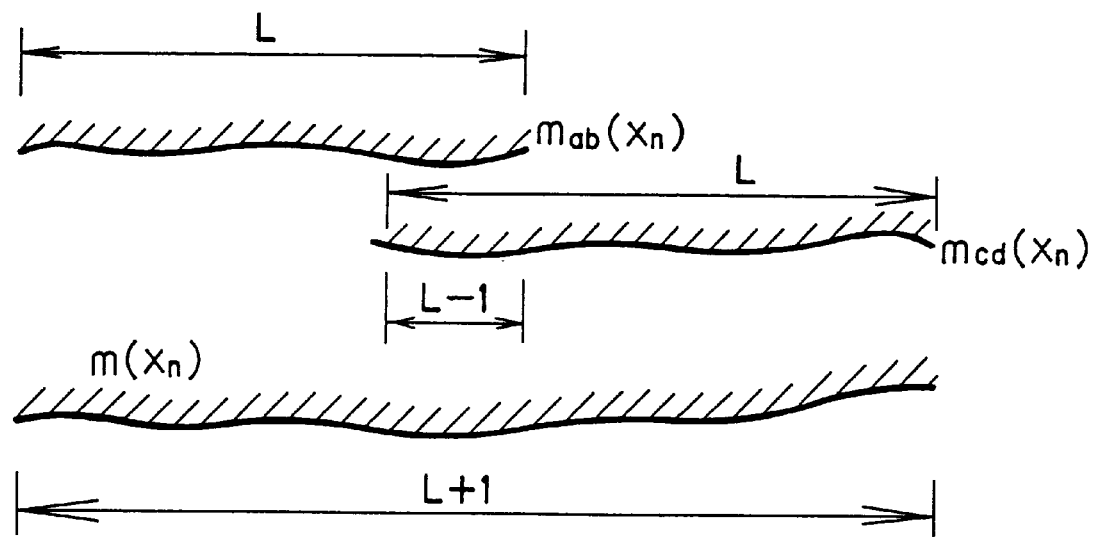
FIG. 5 is a schematic view showing moving ranges of displacement detector mounts when carrying out the roll profile measuring method in the fifth embodiment.

Referring to FIG. 5, $m_{ab}(x_n)$ denotes a fractional roll profile of L in length measured by the combination of the displacement detectors 11a and 11b, while $m_{cd}(x_n)$ denotes a fractional roll profile of L in length measured by the combination of the displacement detectors 11c and 11d. An overlapping portion of L-l in length is formed in each of the $m_{ab}(x_n)$ and the $m_{cd}(x_n)$ at a middle section of the work roll 2. The fractional roll profiles $m_{ab}(x_n)$ and $m_{cd}(x_n)$ are combined such that the gradient components of first order of the overlapping portions are equal to each other, whereby the entire roll profile $m^*(x_n)$ of L+l in length is obtained.

Generally, it is not wise, from the point of view of accuracy and structural stability, to move a heavy member over a long distance on a piece of machinery. The profile of a long roll can be measured with the displacement detectors moved over a short distance by measuring a plurality of fractional profiles of the long roll and combining the fractional profiles as mentioned above. Steps of the roll profile measuring method capable of measuring the profile of a long roll with high accuracy and efficiently by use of a device having a short stroke of movement are summarized as follows:

(i) The displacement detectors 11a, 11b, 11c, and lid measure surface irregularities of the work roll 2 simultaneously as the displacement detector mount 1 of the measuring system shown in FIG. 4 is moved.

(ii) Streams of measured data $y_a(x_n)$, $y_b(x_n)$ $y_c(x_n)$, and $y_d(x_n)$ (n=0, 1, . . . , N−1) at the respective displacement detectors are processed by using Equation (7) to obtain streams of composite measured data $Y_{ab}(x_n)$ and $Y_{cd}(x_n)$ (n=0, 1, 2, . . . , N−1).

(iii) The streams of composite measured data $Y_{ab}(x_n)$ and $Y_{cd}(x_n)$ are subjected to Fourier transformation to determine coefficients ($F_{abj}$, $G_{abj}$) and ($F_{cdj}$, $G_{cdj}$) (j=0, 1, . . . , N−1) for cosine and sine terms.

(iv) Fractional profiles $m_{ab}(x_n)$ and $m_{cd}(x_n)$ are calculated from Equation (10) using the coefficients determined in (iii).

(v) The entire roll profile $m(x_n)$ is determined by combining the fractional profiles $m_{ab}(x_n)$ and $m_{cd}(x_n)$ by use of their overlapping portions.

The profile measuring system shown in FIG. 4 has the two displacement detector sets each of the two displacement detectors placed on the displacement detector mount. However, the profile measuring system may be provided with three or four displacement detector sets.

Figure 6:
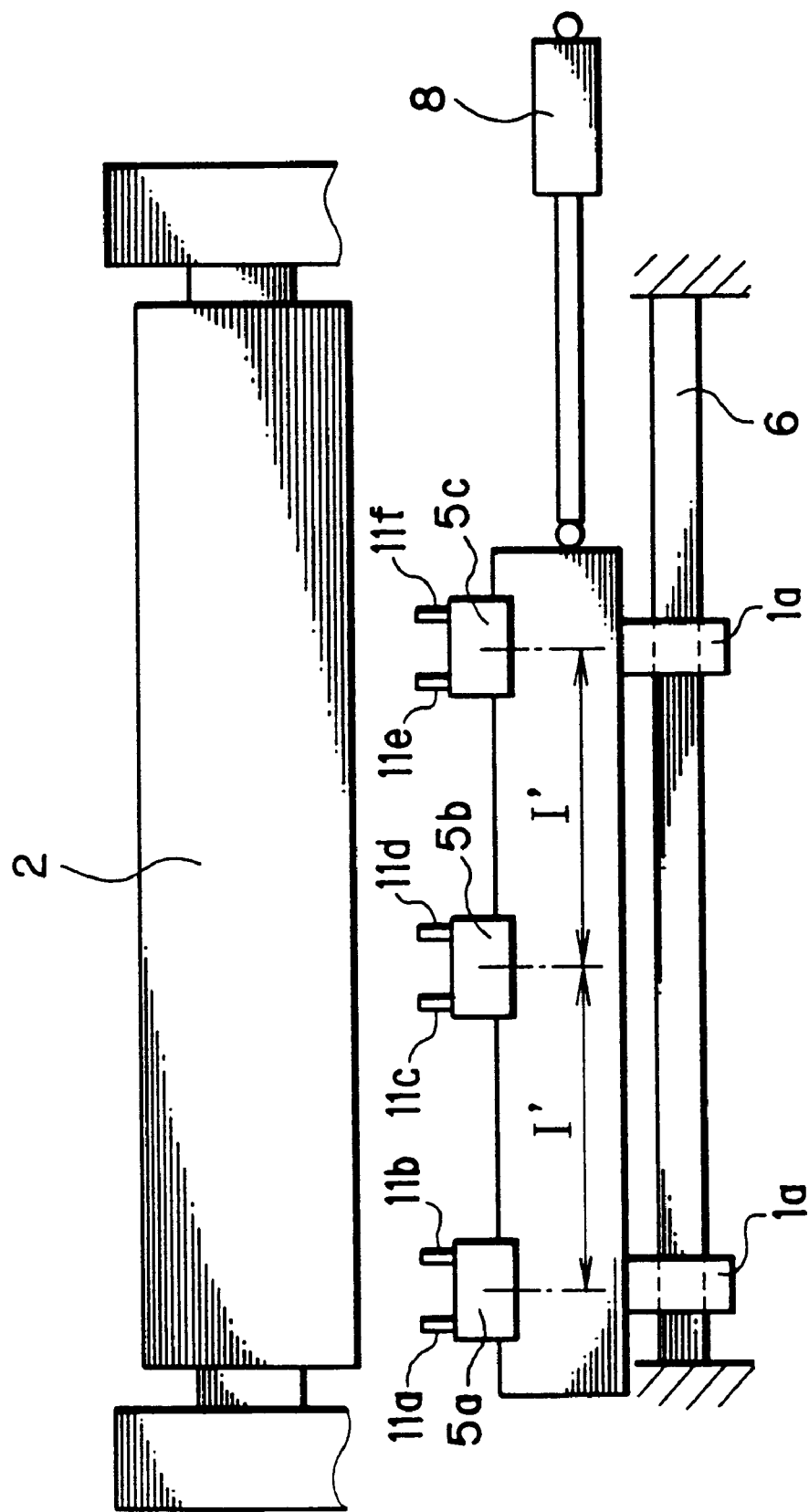
FIG. 6 is a constitutional view of a roll profile measuring system for carrying out the roll profile measuring method in the fifth embodiment.

FIG. 6 shows a profile measuring system provided with three displacement detector sets. The length of stroke of the actuating member of a driving unit 8 for moving the displacement detector mount included in the profile measuring system shown in FIG. 6 may be shorter than that of the actuating member of a driving unit 8 included in the profile measuring system shown in FIG. 4.

Referring to FIG. 6, the profile measuring system has a first displacement detector set of displacement detectors 11a and 11b supported on a first displacement detector support tube 5a, a second displacement detector set of displacement detectors 11c and 11d supported on a second displacement detector support tube 5b, and a third displacement detector set of displacement detectors 11e and 11f supported on a third displacement detector support tube 5c. The center distances between the adjacent displacement detector support tubes are designated as l'. Roll profile measuring lengths of the first, the second, and the third displacement detector set are designated as L' (L' is equal to the length of stroke of the actuating member of the driving unit 8, and L'>l'). Therefore, the total roll profile measuring length is L'+2l'. In the profile measuring system shown in FIG. 4, the total roll profile measuring length is L+l. The length L' of stroke of the actuating member of the driving unit 8 of the profile measuring system shown in FIG. 6 is shorter than the length L of stroke of the actuating member of the driving unit 8 of the profile measuring system shown in FIG. 4 (i.e., L'<L). Yet, the same measuring length can be achieved (i.e., L+l=L'+2l').

FIG. 6 shows an embodiment in which a profile measuring system is provided with three displacement detector sets, each set consisting of two displacement detectors. By providing the profile measuring system with an increased number of (e.g., 4 or 5) displacement detector sets, the entire roll profile of the work roll 2 can be measured, even when the length L' of stroke of the actuating member of the driving unit 8 shown in FIG. 6 is further reduced.

The idea of the profile measuring method in the fifth embodiment is not applied only to the first embodiment, but is also applicable to the second, the third, and the fourth embodiment.

Figure 7:
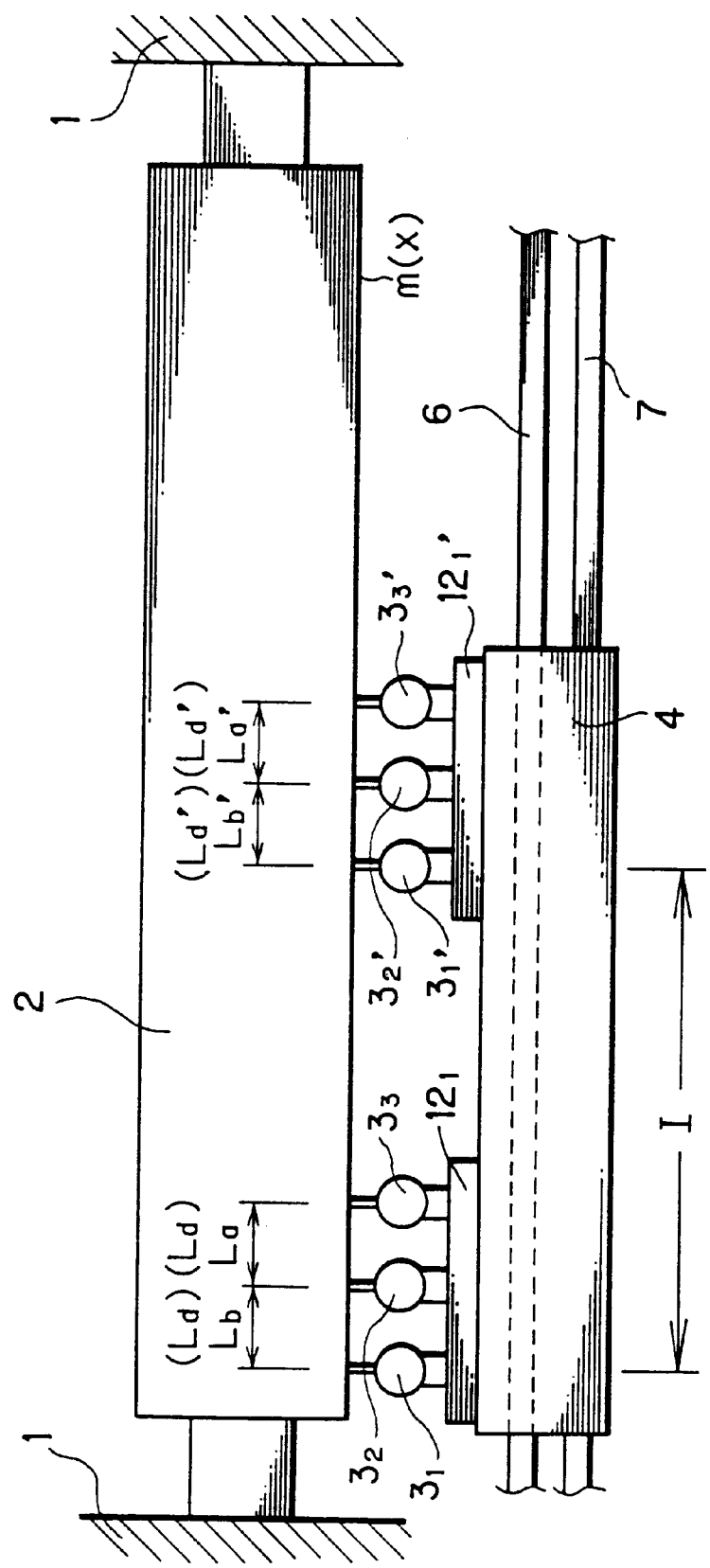
FIG. 7 is a constitutional view of a roll profile measuring system for carrying out the roll profile measuring method in the fifth embodiment.

FIG. 7 shows an example in which a plurality of sets of displacement detectors, each set consisting of three displacement detectors (two displacement detector sets are shown here), as indicated in FIG. 2, are mounted on a displacement detector mount 4. The three displacement detectors $3_1$, $3_2$, and $3_3$ are mounted on a displacement detector support tube $12_1$, and the three displacement detectors $3_1'$, $3_2'$ and $3_3'$ are mounted on a displacement detector support tube $12_1'$. The center distances between the displacement detectors $3_1$ and $3_2$, the displacement detectors $3_2$ and $3_3$, the displacement detector $3_1'$ and $3_2'$ and the displacement detectors $3_2'$ and $3_3'$ are $L_b$, $L_a$, $L_b'$, and $L_a'$, respectively. The distance between the displacement detector support tubes $12_1$ and $12_1'$ is l.

A displacement detector mount 4 is driven for movement along the axial direction of a work roll 2 to measure surface irregularities of the work roll 2 at predetermined sampling pitches. The displacement detector set of the three displacement detectors $3_1$, $3_2$, and $3_3$ measures surface irregularities of a left-hand portion of the roll (referred to as a left-hand fractional roll profile), and the displacement detector set ($3_1'$, $3_2'$, $3_3'$) measures surface irregularities of a right-hand portion of the roll (referred to as a right-hand fractional roll profile). The distance L of movement of the displacement detector mount 4 (i.e., the roll profile measuring length of the displacement detector set ($3_1$, $3_2$, $3_3$) and the displacement detector set ($3_1'$, $3_2'$, $3_3'$)) is set to be greater than the distance l between the displacement detector support tubes $12_1$ and $12_1'$ (i.e., l<L). Therefore, overlapping measuring portions of a length L−l at a middle section of the roll occur in the left-hand fractional roll profile and the right-hand fractional roll profile. These fractional roll profiles are combined such that the gradient components of first order of the overlapping portions are equal to each other, whereby the entire roll profile can be obtained.

The number of the displacement detectors needed in the method shown in FIG. 7 is greater than that of the displacement detectors in FIG. 2. However, the displacement detector mount 4 of the profile measuring system shown in FIG. 7 may be moved over a relatively short distance to obtain a long roll profile. When $L_a=L_b$ and $L_a'=L_b'$ in the profile measuring system shown in FIG. 7, the fourth embodiment can be carried out in a fractional roll profile measuring mode.

Computer Simulation

FIGS. 8(a)–8(c) and 9(a)–9(c) outline the results of measurement of the profile of a roll by computer simulation, and show the roll profile obtained by processing measured data obtained by measuring the profile of a truly straight roll ($m(x_n)=0$), with $L_a=L_b=22$ mm and L=1,950 mm in FIG. 2.

Figure 8A:
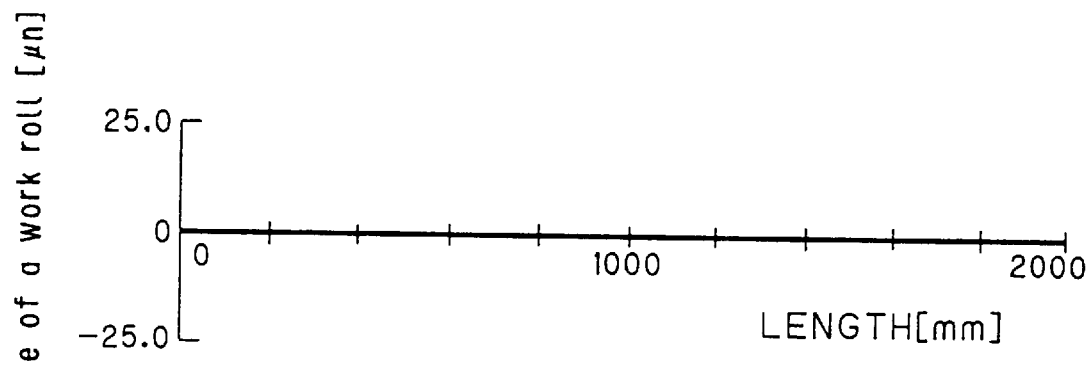
FIGS. 8(a), 8(b), and 8(c) are diagrams showing the calculated profile of a work roll obtained through computer simulation.
Figure 8B:
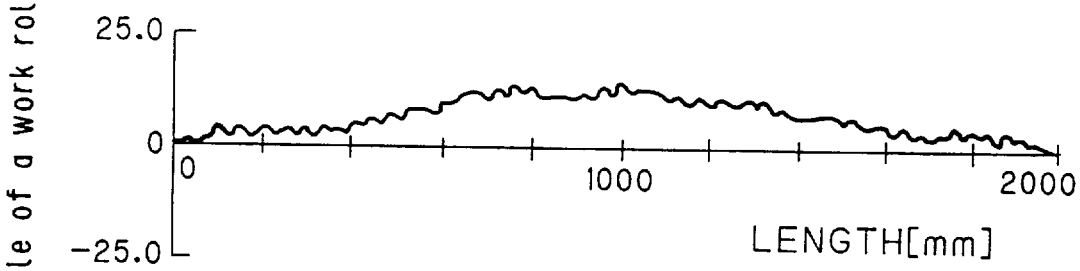
Figure 8C:
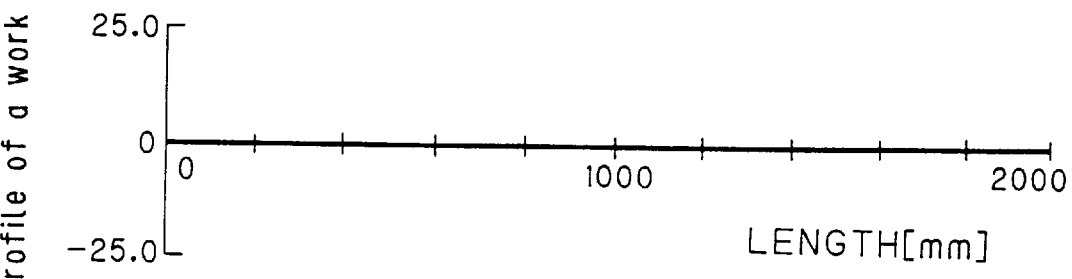

(i) Evaluation of Motion Errors (FIGS. 8(a)–8(c))

FIGS. 8(a)–8(c) show the results of analysis of a case where a predetermined pitching motion error $e_p(x)$ occurs in normal random numbers when the displacement detector mount 4 moves. FIG. 8(a) shows data obtained by calculation according to the three-point method of the earlier technology, FIG. 8(b) shows data obtained by calculation according to the two-point method in the first embodiment using the displacement detector set ($3_1$, $3_3$), and FIG. 8(c) shows data obtained by calculation according to the fourth embodiment. As shown in FIG. 8(b), an evaluation error is caused by the motion error $e_p(x)$ when the profile is measured by the two-point method, and the measured profile does not coincide with the true profile of the truly straight roll. As is obvious from FIGS. 8(a) and 8(c), on the other hand, the profiles determined by the three-point method and the profile measuring method in the fourth embodiment are not affected by the motion error $e_p(x)$, and coincide with the true profile of the truly straight roll. These findings corroborate the foregoing explanation.

Figure 9A:
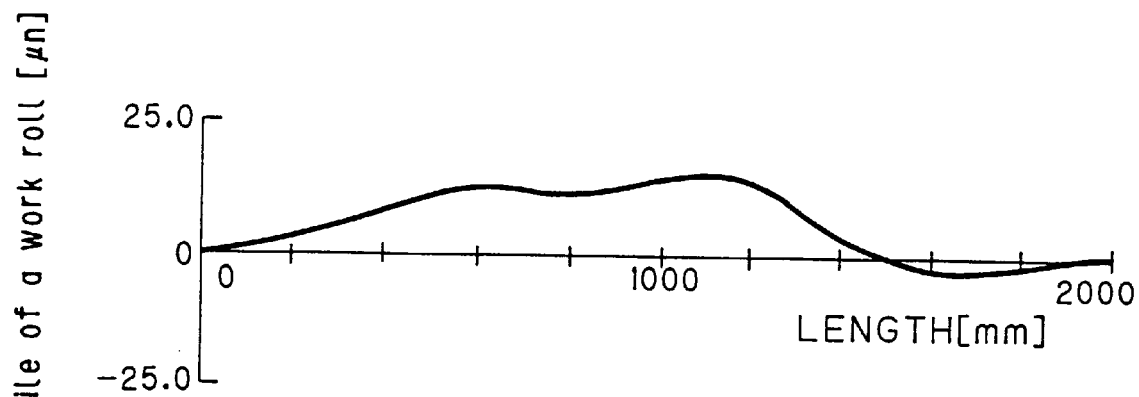
FIGS. 9(a), 9(b), and 9(c) are diagrams showing the calculated profile of a work roll obtained through computer simulation.
Figure 9B:
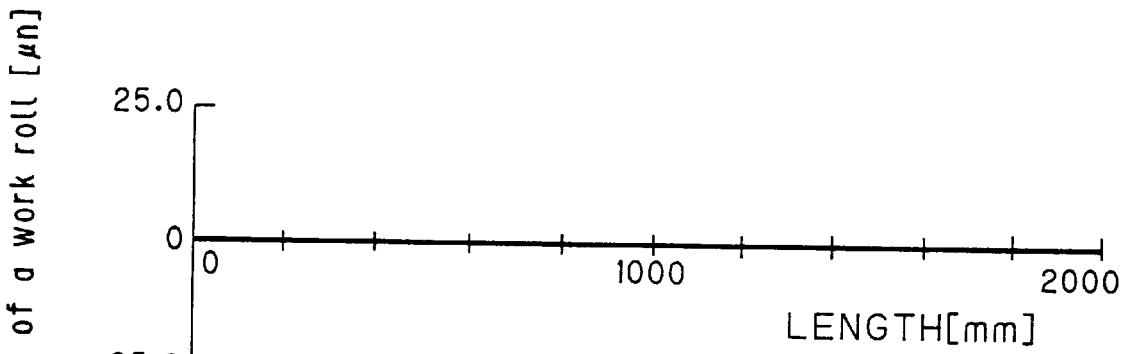
Figure 9C:
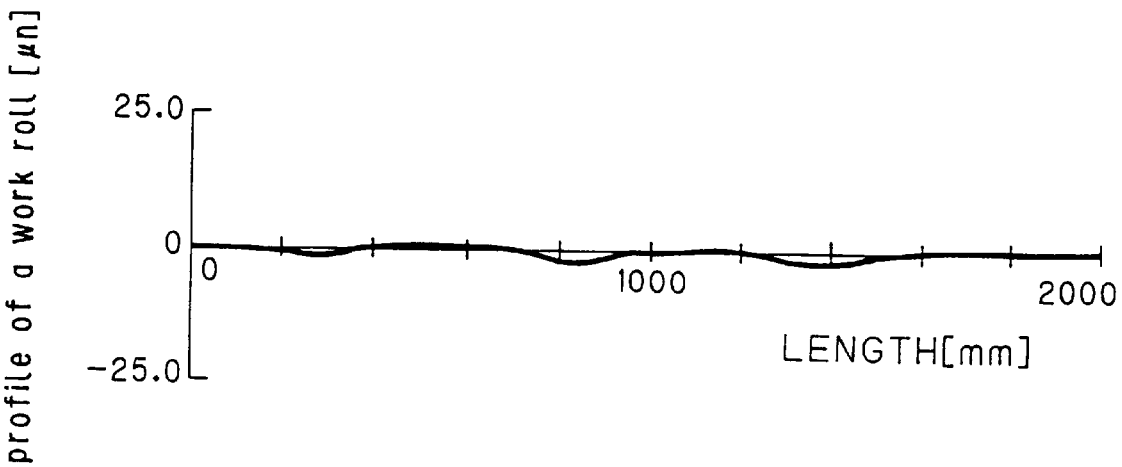

(ii) Evaluation of Measurement Noise (FIGS. 9(a)–9(c))

FIGS. 9(a)–9(c) show the results of analysis of a case where the displacement detector mount 4 does not cause any motion error, but measured data provided by the displacement detectors includes predetermined measurement noise. FIG. 9(a) shows data obtained by calculation according to the three-point method, FIG. 9 (b) shows data obtained by calculation according to the two-point method, and FIG. 9(c) shows data obtained by calculation according to the fourth embodiment, as in FIGS. 8(a), 8(b), and 8(c)

As mentioned above, the three-point method causes a large shape evaluation error in low-order modes, whereas the two-point method and the profile measuring method of the present invention cause only a small shape evaluation error. The shape evaluation error in the data shown in FIG. 9(b) is smaller than that in the data shown in FIG. 9(c), because the data shown in FIG. 9(b) is obtained by the two-point method in which $L_c=2L_d$, while the data shown in FIG. 9(c) is obtained by the two-point method in which $L_c=L_d$, and as is obvious from Equation (11), the influence of the measurement noise is significant.

FIGS. 10(a)–10(c) and 11(a)–11(c) show the profile of a roll determined by computer simulation using the profile measuring system shown in FIG. 7 in which $L_a=L_b=L_a'=L_b'=22$ mm, l=1042 mm, and L=1142 mm.

(iii) Case Where No Measurement Noise is Caused

Figure 10A:
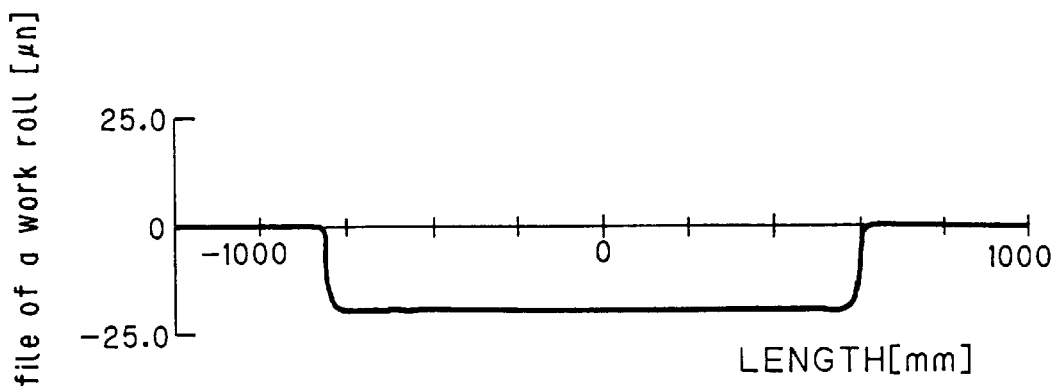
FIGS. 10(a), 10(b), and 10(c) are diagrams showing the calculated profile of a work roll obtained through computer simulation.
Figure 10B:
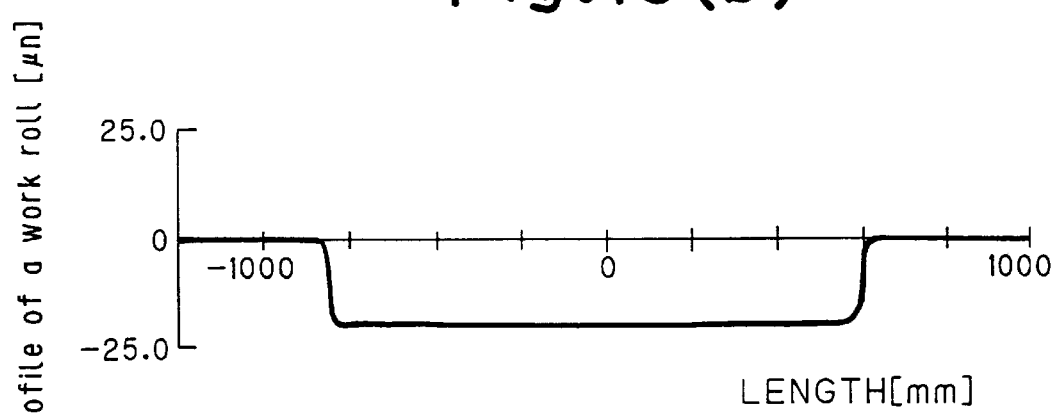
Figure 10C:
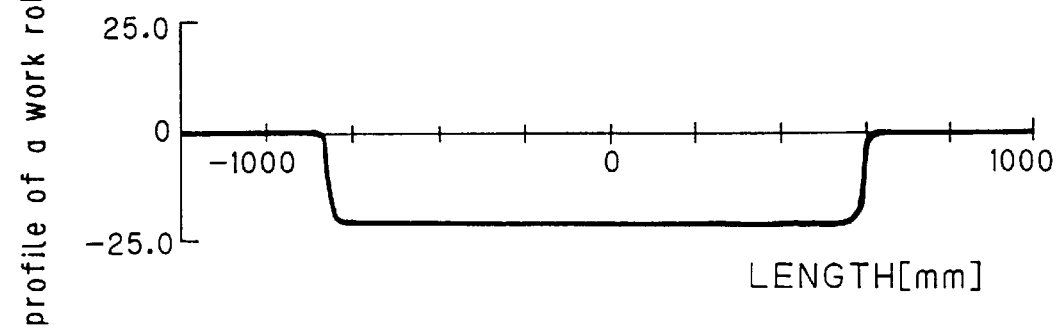

FIGS. 10(a)–10(c) show measured data on the profile of a work roll 2 having a recessed middle section obtained by measurement in the absence of measurement noise. FIG. 10(a) shows a roll profile determined by processing measured data obtained by the three-point method of the earlier technology, FIG. 10(b) shows a roll profile determined by processing the measured data obtained by the two-point method using the combination of the displacement detectors $3_1$ and $3_3$ and the combination of the displacement detectors $3_1'$ and $3_3'$, and FIG. 10(c) shows a roll profile determined by processing the measured data obtained by the roll profile measuring method in the third embodiment. It is known from FIGS. 10(a), 10(b), and 10(c) that the true profile of the work roll 2 having a recessed middle section can be evaluated correctly by all those methods in the absence of measurement error.

(iv) Evaluation of Measurement Noise

Figure 11A:
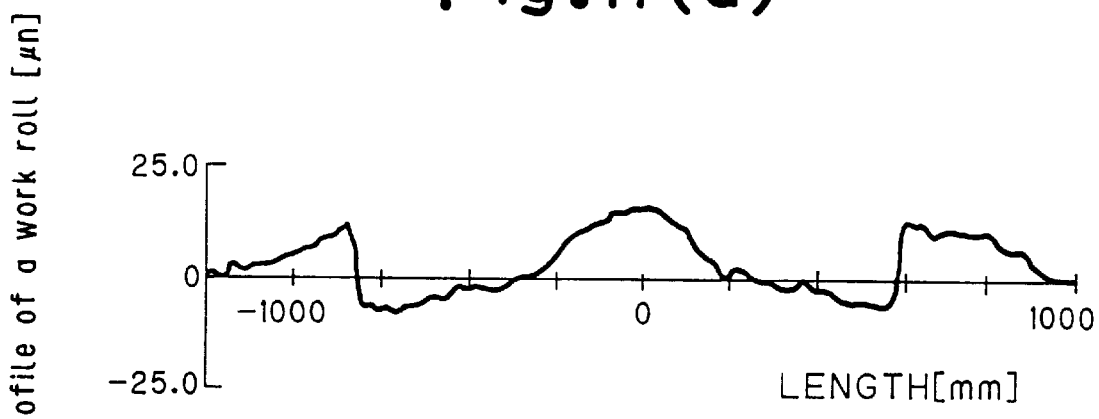
FIGS. 11(a), 11(b), and 11(c) are diagrams showing the calculated profile of a work roll obtained through computer simulation.
Figure 11B:
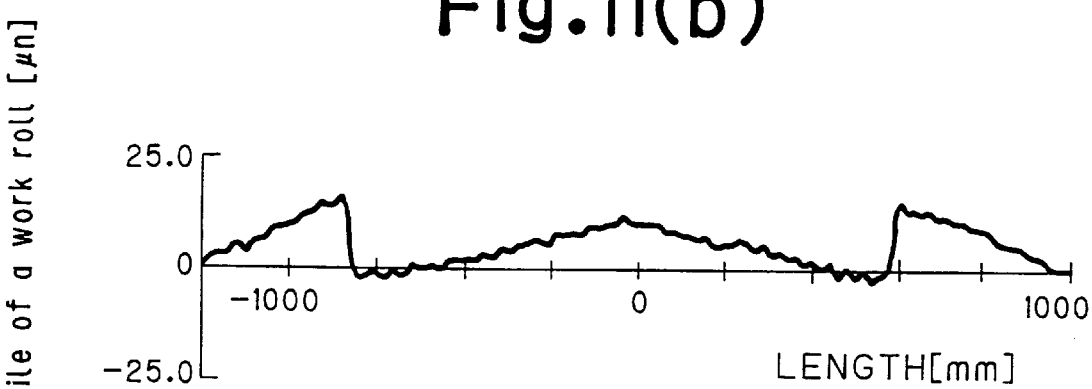
Figure 11C:
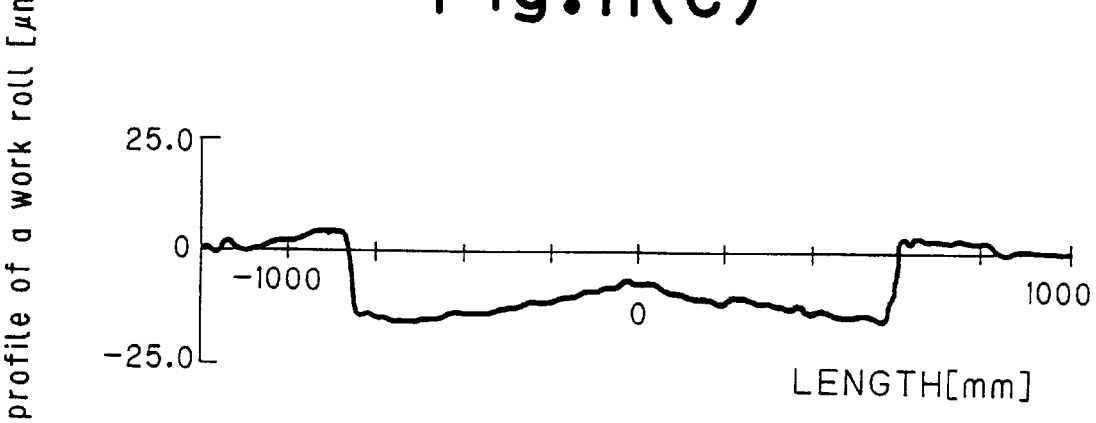

FIGS. 11(a)–11(c) show measured data on the profile of the same work roll 2 as in FIGS. 10(a)–10(c), measured under the influence of measurement noise (normal random numbers of standard deviation σ=2 μm). FIG. 11(a) shows a profile determined by processing measured data obtained by the three-point method, FIG. 11(b) shows a profile determined by processing data obtained by the two-point method using the displacement detector set ($3_1$, $3_3$) and the displacement detector set ($3_1'$, $3_3'$) and FIG. 11(c) shows a profile determined by processing the measured data obtained by the profile measuring method in the third embodiment.

As mentioned above, the shape evaluation error in low-order modes is large in the three-point method, and the shape evaluation error in high-order modes is large in the two-point method. However, the profile measuring method in accordance with the present invention can determine the profile with relatively small shape evaluation errors in both low-order and high-order modes, which verifies the foregoing explanation.

Figure 12:
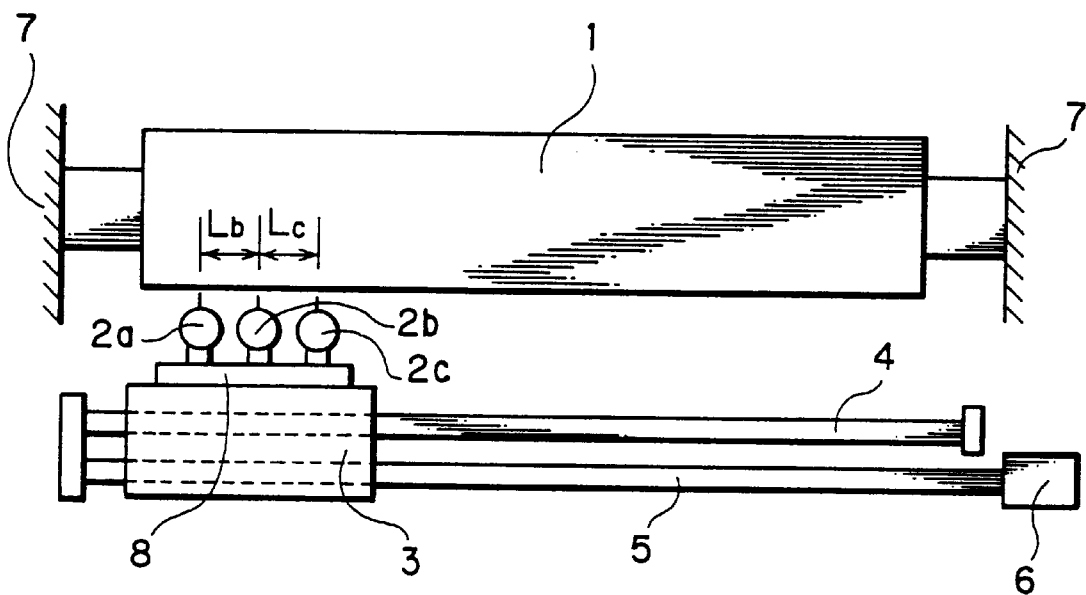
FIG. 12 is a schematic constitutional view of a roll profile measuring system for carrying out a roll profile measuring method in a sixth embodiment according to the present invention.
Figure 13:
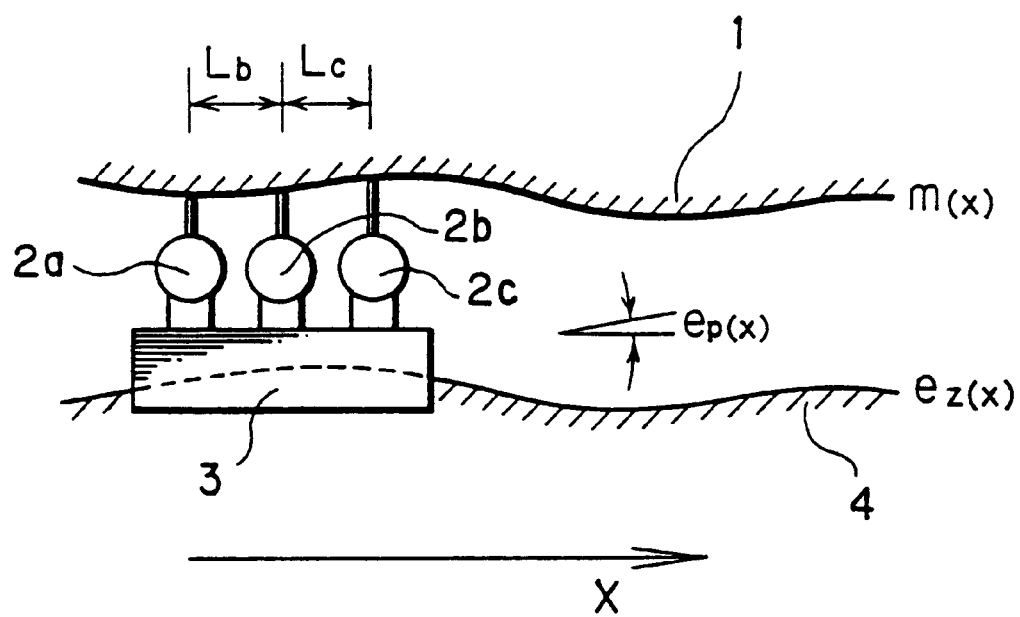
FIG. 13 is a schematic concept view of an essential part of the roll profile measuring system shown in FIG. 12.

Next, a profile measuring method in a sixth embodiment according to the present invention will be described with reference to FIGS. 12 and 13. FIG. 12 is a schematic constitutional view of a roll profile measuring system for carrying out a roll profile measuring method in the sixth embodiment according to the present invention. FIG. 13 is a schematic concept view of an essential part of the roll profile measuring system shown in FIG. 12 as an explanation for the roll profile measuring method.

Referring to FIG. 12, there are shown a work roll 1 as an object to be measured, a first displacement detector 2a, a second displacement detector 2b, a third displacement detector 2c, and a displacement detector mount 3. The displacement detector mount 3 is slidably fitted on a guide rail 4. A threaded shaft 5 is driven for rotation by a motor 6 to move the displacement detector mount 3 in a reciprocating manner in an axial direction of the work roll 1. The guide rail 4, the threaded shaft 5, and the motor 6 are mounted on a support beam (not shown) and the support beam and the work roll 1 are supported on a housing 7.

In FIG. 12, the reference numeral 8 denotes a displacement detector support tube, on which the first displacement detector 2a, the second displacement detector 2b, and the third displacement detector 2c are borne so as to be movable toward and away from the work roll 1. To measure surface irregularities of the work roll 1, the first displacement detector 2a, the second displacement detector 2b, and the third displacement detector 2c are borne on the displacement detector support tube 8 at center distances $L_b$ and $L_c$ in the axial direction of the work roll 1. The displacement detector support tube 8 advances the first displacement detector 2a, the second displacement detector 2b, and the third displacement detector 2c by a predetermined distance toward the work roll 1. Thus, the first displacement detector 2a, the second displacement detector 2b, and the third displacement detector 2c simultaneously measure surface irregularities in the work roll 1 when the first displacement detector 2a, the second displacement detector 2b, and the third displacement detector 2c are advanced toward the work roll 1 by the displacement detector support tube 8 and the displacement detector mount 3 is moved in the axial direction of the work roll 1.

The roll profile measuring method using the three displacement detectors 2a, 2b, and 2c will be described with reference to FIG. 13. Referring to FIG. 13, x is an abscissa on the x-axis of a coordinate system having its origin at the initial position of the first displacement detector 2a, and m(x) an ordinate corresponding to x and representing an error in the profile of the work roll 1, $e_z(x)$ is a translational motion error corresponding to x caused by the translation of the displacement detector mount 3 relative to the work roll 1, and $e_p(x)$ is a pitching motion error corresponding to x caused by the pitching of the displacement detector mount 3 relative to the axis of the work roll 1.

Measured Data at the First, Second, and Third Displacement Detectors 2a, 2b, and 2c Measured data $y_{2a}(x_n)$, $y_{2b}(x_n)$, and $y_{2c}(x_n)$ provided by the first displacement detector 2a, the second displacement detector 2b, and the third displacement detector 2c, respectively, at positions $x_n$(n=0, 1, 2 ..., N−1) of shift of the displacement detector mount 3 are expressed by:

$$y_{2a}(x_n)=m(x_n)-e_z(x_n)$$

$$y_{2b}=(x_n)=m(x_n+L_b)-e_z(x_n)+L_b \cdot e_p(x_n)$$

$$y_{2c}(x_n)=m(x_n+L_b+L_c)-e_z(x_n)+(L_b+L_c) \cdot e_p(x_n)$$

$$(n=0, 1, 2 \ldots, N-1) \qquad (14)$$

Profile Measurement by the First Displacement Detector Set (displacement detectors 2a and 2b)

① Calculation of Composite Measured Data $y_{2a2b}(x_n)$

A composite measured data $y_{2a2b}(x_n)$, defined as the difference between the measured data $y_{2a}(x_n)$ and $y_{2b}(x_n)$, is calculated from Equation (15).

$$y_{2a2b}(x_n) \equiv y_{2b}(x_n) - y_{2a}(x_n)$$

$$= m(x_n + L_b) - m(x_n) + L_b \cdot e_p(x_n)$$

(15)

As is obvious from Equation (15), the composite measured data $y_{2a2b}(x_n)$ does not include the terms concerning $e_z(x_n)$ which have been eliminated. If $e_p(x_n)$ is small, Equation (15) can be approximated by Equation (16)

$$y_{2a2b}(x_n) \approx m(x_n + L_b) - m(x_n)$$

It is known from Equation (16) that the composite measured data $Y_{2a2b}(x_n)$ is expressed approximately by the superposition of the true profile $m(x_n)$ and the measured data $m(x_n + L_b)$ phase changed by $L_b$.

② Regeneration of Profile $m(x_n)$

The profile $m(x_n)$ (n=0, 1, 2 ..., N-1) can be regenerated by subjecting the composite measured data $y_{2a2b}(x_n)$ (n=0, 1, 2 ..., N-1) to Fourier transformation. The profile $m(x_n)$ is expressed as the sum of Fourier series as in Equation (17).

$$m(x_n) = \sum_{k=0}^{N-1} C_k \cdot \cos\left(\frac{2\pi K x_n}{L} + \phi_k\right) \quad (17)$$

where L is the measuring length of the object to be measured, $C_k$ is the amplitude of a shape component of Kth order of $m(x_n)$, $\phi_k$ is a phase difference of a component of Kth order. Rearranging Equation (16) by substituting Equation (17) into Equation (16), we obtain:

$$Y_{2a2b}(x_n) = \sum_{K=0}^{N-1} \left[ C_k \cdot \cos\left\{\frac{2\pi K(x_n + L_b)}{L} + \phi_k\right\} - C_k \cdot \cos\left(\frac{2\pi K x_n}{L} + \phi_k\right) \right]$$

$$= \sum_{K=0}^{N-1} \left[ F_k \cdot \cos 2\pi \frac{K x_n}{L} + G_k \cdot \sin 2\pi \frac{K x_n}{L} \right] \quad (18)$$

where:

$F_k = -C_k \cdot f_k \cdot (\cos \phi_k \cdot \cos \delta_k - \sin \phi_k \cdot \sin \delta_k)$ $G_k = C_k \cdot f_k \cdot (\sin \phi_k \cdot \cos \delta_k + \cos \phi_k \cdot \sin \delta_k)$ $$f_k = \sqrt{(\cos K\beta - 1)^2 + (\sin K\beta)^2}$$

$$\delta_k = \tan^{-1}\left\{\frac{\sin K\beta}{(\cos K\beta - 1)}\right\}$$

$$\beta = \frac{2\pi L_a}{L}$$

The profile $m(x_n)$ can be expressed as in Equation (19) by using $F_k$ and $G_k$.

$$m(x_n) = -\sum_{K=0}^{N-1} \frac{1}{f_k} \left[ (F_k \cdot \cos\delta_k - G_k \cdot \sin\delta_k) \cdot \cos 2\pi \frac{K x_n}{L} + \right. \quad (19)$$

$$\left. (F_k \cdot \sin\delta_k + G_k \cdot \cos\delta_k) \cdot \sin 2\pi \frac{K x_n}{L} \right]$$

That is, the profile $m(x_n)$ of the work roll 1 can be calculated from Equation (19) by using the coefficient $F_k$ for the cosine component of Kth order, the coefficient $G_k$ for the sine component of Kth order and the value $\delta_k$ for the profile measuring system when the coefficients $F_k$ and $G_k$ are determined through the Fourier transformation of the stream of composite measured data $y_{2a2b}(x_n)$ (n=0, 1, 2 ..., N-1)

The roll profile $m_{2a2b}(x_n)$ (n=0, 1, 2 ..., N-1) of the work roll 1 can be expressed as in Equation (20) on the basis of the measured data provided by the first displacement detector 2a and the second displacement detector 2b.

$$m_{2a2b}(x_n) m(x_n) + Er_{2a2b}(x_n) \quad (20)$$

where $Er_{2a2b}(x_n)$ is an error component caused by the pitching motion error component $L_b \cdot e_p(x_n)$ of Equation (14). The relation between the error component $Er_{2a2b}(x_n)$ and the pitching motion error $e_p(x_n)$ can be expressed by Equation (21), because the profile $m(x_n)$ is regenerated by using the composite measured data $(= m(x_n + L_b) - m(x_n))$.

$$Er_{2a2b}(x_n + L_b) - Er_{2a2b}(x_n) = L_b \cdot e_p(x_n) \quad (21)$$

Profile Measurement by the Second Displacement Detector Set (displacement detectors 2a and 2c)

The profile $m_{2a2c}(x_n)$ (n=0, 1, 2 ..., N-1) of the work roll 1 is determined as in Equation (22) on the basis of measured data provided by the first displacement detector 2a and the third displacement detector 2c.

$$m_{2a2c}(x_n) = m(x_n) + Er_{2a2c}(x_n) \quad (22)$$

where $Er_{2a2c}(x_n)$ is an error component caused by the pitching motion error component $(L_b + L_c) \cdot e_p(x_n)$ of Equation (14).

Similarly, the relation between $Er_{2a2c}(x_n)$ and $e_p(x_n)$ is expressed by:

$$Er_{2a2c}(x_n + L_b + L_c) - Er_{2a2c}(x_n) = (L_b + L_c) \cdot e_p(x_n) \quad (23)$$

Derivation of $e_p(x_n)$ from $m_{2a2b}(x_n)$ and $m_{2a2c}(x_n)$

An arithmetic procedure for determining the pitching motion error component $e_p(x_n)$ from the profiles $m_{2a2b}(x_n)$ and $m_{2a2c}(x_n)$ expressed by Equations (20) and (22), respectively, will be described below.

$Er_{2a2b}(x_n)$, $Er_{2a2c}(x_n)$ and $e_p(x_n)$ are expressed by the sums of the terms up to the mth order of trigonometric series as in Equation (24).

$$Er_{2a2b}(x_n) = \sum_{K=0}^{m} \left[ a_k^1 \cdot \cos\left(\frac{2\pi K x_n}{L}\right) + b_k^1 \cdot \sin\left(\frac{2\pi K x_n}{L}\right) \right] \quad (24)$$

$$Er_{2a2c}(x_n) = \sum_{K=0}^{m} \left[ a_k^2 \cdot \cos\left(\frac{2\pi K x_n}{L}\right) + b_k^2 \cdot \sin\left(\frac{2\pi K x_n}{L}\right) \right]$$

$$e_p(x_n) = \sum_{K=0}^{m} \left[ C_k \cdot \cos\left(\frac{2\pi K x_n}{L}\right) + d_k \cdot \sin\left(\frac{2\pi K x_n}{L}\right) \right]$$

$K = 0, 1, 2 \ldots m$

Rearranging Equation (21) by substituting Equation (24) into Equation (21), we obtain Equation (25).

$$L_b \cdot C_k = \left\{\cos\left(\frac{2\pi KL_b}{L}\right) - 1\right\} \cdot a_k^1 + \sin\left(\frac{2\pi KL_b}{L}\right) \cdot b_k^1 \quad (25)$$

$$L_b \cdot d_k = -\sin\left(\frac{2\pi KL_b}{L}\right) \cdot a_k^1 + \left\{\cos\left(\frac{2\pi KL_b}{L}\right) - 1\right\} \cdot b_k^1$$

Similarly, rearranging Equation (23) by substituting Equation (24) into Equation (23), we obtain Equation (26).

$$(L_b + L_c) \cdot C_k = \left[\cos\left\{\frac{2\pi K(L_b + L_c)}{L}\right\} - 1\right] \cdot a_k^2 + \quad (26)$$

$$\sin\left\{\frac{2\pi K(L_b + L_c)}{L}\right\} \cdot b_k^2$$

$$(L_b + L_c) \cdot d_k = -\sin\left\{\frac{2\pi K(L_b + L_c)}{L}\right\} \cdot a_k^2 +$$

$$\left[\cos\left\{\frac{2\pi K(L_b + L_c)}{L}\right\} - 1\right] \cdot b_k^2$$

Using Equations (25) and (26), $(a^2_k - a^1_k)$ is expressed by Equation (27).

$$a^2_k - a^1_k = -A_k \cdot C_k - B_k \cdot d_k$$
$$b^2_k - b^1_k = B_k \cdot C_k - A_k \cdot d_k \quad (27)$$

where $$A_k = \frac{L_c}{2}$$

$$B_k = \frac{1}{2}\left[\frac{(L_b + L_c) \cdot \sin\left\{\frac{2\pi K(L_b + L_c)}{L}\right\}}{1 - \cos\left\{\frac{2\pi K(L_b + L_c)}{L}\right\}} - \frac{L_b \cdot \sin\left(\frac{2\pi KL_b}{L}\right)}{1 - \cos\left(\frac{2\pi KL_b}{L}\right)}\right]$$

$A_k$ and $B_k$ are values specific to the profile measuring system.

The coefficients $C_k$ and $d_k$ to determine $e_p(x_n)$ can be expressed by Equation (28) on the basis of Equation (27).

$$C_k = -\frac{A_k \cdot (a_k^2 - a_k^1) - B_k \cdot (b_k^2 - b_k^1)}{A_k^2 + B_k^2} \quad (28)$$

$$d_k = -\frac{B_k \cdot (a_k^2 - a_k^1) + A_k \cdot (b_k^2 - b_k^1)}{A_k^2 + B_k^2}$$

The difference $m_r(x_n)$ between the profiles $m_{2a2b}(x_n)$ and $m_{2a2c}(x_n)$ defined, respectively, by Equations (20) and (22) is determined based on Equation (24) as follows:

$$m_r(x_n) \equiv m_{2a2c}(x_n) - m_{2a2b}(x_n) \quad (29)$$

$$= Er_{2a2c}(x_n) - Er_{2a2b}(x_n)$$

$$= \sum_{K=0}^{m}\left[(a_k^2 - a_k^1) \cdot \cos\left(\frac{2\pi K x_n}{L}\right) + (b_k^2 - b_k^1) \cdot \sin\left(\frac{2\pi K x_n}{L}\right)\right]$$

That is, the values of $(a^2_k - a^1_k)$ and $(b^2_k - b^1_k)$ of Equation (28) can be expressed as the coefficients of the cosine and sine terms of an expression obtained by subjecting the profile $m_r(x_n)$ to Fourier transformation. Thus, the coefficients $C_k$ and $d_k$ are determined, and the pitching motion error component $e_p(x_n)$ can be determined by substituting the coefficients $C_k$ and $d_k$ into Equation (24).

High-accuracy Profile Measurement through Correction Using Pitching Motion Error Component $e_p(x_n)$ The term $L_b \cdot e_p(x_n)$ of Equation (14) can be eliminated by using the pitching motion error component $e_p(x_n)$ thus determined by the foregoing procedure. Therefore, the profile of the work roll 1 can be measured by the first displacement detector 2a and the second displacement detector 2b with high accuracy without being affected by the pitching motion error component $e_p(x_n)$.

The foregoing roll profile measuring method can be summarized as follows:

(1) As shown in FIG. 12, the first displacement detector 2a, the second displacement detector 2b, and the third displacement detector 2c are supported on the displacement detector mount 3 at the center distances $L_b$ and $L_c$, and these displacement detectors measure surface irregularities in the work roll 1 simultaneously while moving in the axial direction of the work roll 1 to provide streams of measured data expressed by Equation (14).

(2) The profile $m_{2a2b}(x_n)$ (n=0, 1, 2 ..., N-1) expressed by Equation (20) and including an error component caused by the pitching motion error $e_p(x_n)$ is determined by processing the measured data provided by the combination of the first displacement detector 2a and the second displacement detector 2b.

(3) Similarly, the profile $m_{2a2c}(x_n)$ (n=0, 1, 2 ..., N-1) expressed by Equation (22) is determined by processing the measured data provided by the combination of the first displacement detector 2a and the third displacement detector 2c.

(4) The difference $m_r(x_n)$ between the profiles $m_{2a2b}(x_n)$ and $m_{2a2c}(x_n)$, expressed by Equation (29), is determined.

(5) The coefficients $(a^2_k - a^1_k)$ and $(b^2_k - b^1_k)$ (K=0, 1, 2 ..., m) of the cosine and sine components shown in Equation (29) are determined through the Fourier transformation of the difference $m_r(x_n)$.

(6) The coefficients $C_k$ and $d_k$ for determining the pitching motion error component $e_p(x_n)$ are determined as in Equation (28) by using the coefficients $(a^2_k - a^1_k)$ and $(b^2_k - b^1_k)$ determined in (5), and the coefficients $A_k$ and $B_k$ of Equation (27).

(7) The pitching motion error component $e_p(x_n)$ is determined as in Equation (24) by using the coefficients $C_k$ and $d_k$, and $L_b \cdot e_p(x_n)$ is removed, for example, from the measured data $y_{2b}(x_n)$ expressed by Equation (14).

(8) The stream of measured data $y_{2b}(x_n)$ from which the pitching motion error component $e_p(x_n)$ has been removed, and the data stream $y_{2a}(x_n)$ is processed to determine the true profile $m(x_n)$ of the work roll 1 not affected by the influence of the pitching motion error component $e_p(x_n)$ It is also possible to determine the true roll profile $m(x_n)$ not affected by the influence of the pitching motion error component $e_p(x_n)$ by calculating the pitching motion error component $e_p(x_n)$ from Equation (24), removing the $L_b \cdot e_p(x_n)$ from the measured data $y_{2c}(x_n)$ expressed by Equation (14), and using the streams of measured data $y_{2c}(x_n)$ and $y_{2a}(x_n)$.

The foregoing roll profile measuring method determines the pitching motion error component $e_p(x_n)$ on the basis of the two roll profile data including the influence of the pitching motion error component $e_p(x_n)$ obtained by calculation, removes the pitching motion error component $e_p(x_n)$ from the measured data, and determines the profile of the work roll not including the influence of the pitching motion error component $e_p(x_n)$ by calculation. Accordingly, the profile of the work roll can be measured with high accuracy even if the pitching motion error component $e_p(x_n)$ caused by the pitching of the displacement detector mount 3 is large.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A roll profile measuring method using a displacement detector mount provided movably in a reciprocating manner along an axial direction of a work roll, and a set of two displacement detectors arranged at a center distance $L_c$ on the displacement detector mount for measuring surface irregularities of the work roll in the axial direction thereof, comprising:

measuring the surface irregularities of the work roll over the total length of the work roll by moving the displacement detector mount in the axial direction of the work roll; and processing a data stream of composite measured values calculated from differences between measured values obtained by the displacement detectors to determine the surface irregularities of the work roll in the axial direction thereof.

2. A roll profile measuring method using a displacement detector mount provided movably in a reciprocating manner along an axial direction of a work roll, and a plurality of displacement detector sets arranged on the displacement detector mount at a distance l from one another set for measuring irregularities in a plurality of fractions of a surface of the work roll in the axial direction of the work roll, each set including two displacement detectors spaced a center distance $L_c$ apart from each other, comprising:

measuring irregularities in the fractions of the surface of the work roll by moving the displacement detector mount in the axial direction of the work roll;

carrying out first profile measurement for each set of the two displacement detectors to determine a plurality of fractional roll profiles, said first profile measurement comprising:

measuring the surface irregularities of the work roll over the total length of the work roll by moving the displacement detector mount in the axial direction of the work roll; and processing a data stream of composite measured values calculated from differences between measured values obtained by the displacement detectors to determine the surface irregularities of the work roll in the axial direction thereof, a measured length of each of the fractional roll profiles being greater than the distance between the adjacent sets of two displacement detectors each in order that the plurality of fractional roll profiles overlap each other; and combining the plurality of fractional roll profiles by using overlaps of the plurality of fractional roll profiles to obtain a roll profile over the total length of the work roll.

3. A roll profile measuring method using a displacement detector mount provided movably in a reciprocating manner along an axial direction of a work roll, a plurality of displacement detectors for profile measurement arranged on the displacement detector mount for measuring irregularities in a plurality of fractions of a surface of the work roll in the axial direction of the work roll, and a plurality of sets of displacement detectors for motion error measurement arranged on the displacement detector mount, each set including three displacement detectors arranged at center distances $L_a$ and $L_b$ in the axial direction of the work roll for measuring a motion error of the displacement detector mount and an error in the rotation of the work roll, comprising:

measuring irregularities in fractions of the surface of the work roll by the displacement detectors for profile measurement and the displacement detectors for motion error measurement by moving the displacement detector mount in the axial direction of the work roll;

processing measured values provided by the displacement detectors for motion error measurement to determine a motion error caused by the movement of the displacement detector mount and the rotation of the work roll;

subtracting the determined motion error from the measured values provided by the displacement detectors for profile measurement to correct the measured values; and combining the corrected measured values of irregularities in the fractions of the surface of the work roll to obtain surface irregularities in the axial direction of the work roll over the total length of the work roll, wherein when grasping the motion error by processing data provided by the displacement detectors for motion error measurement, two roll profile measuring systems are constructed from a combination of two sets of displacement detectors arranged at a center distance $L_a+L_b$ and a center distance $L_b$, respectively, by the use of the set of the three displacement detectors for motion error measurement, and either of the profile measuring systems which is unsusceptible to measurement noise is used selectively for components of each order.

4. A roll profile measuring method using a displacement detector mount provided movably in a reciprocating manner along an axial direction of a work roll, and a set of three displacement detectors arranged at center distances $L_a$ and $L_b$ on the displacement detector mount for measuring irregularities in the axial direction of the work roll, comprising:

measuring surface irregularities of the work roll over the total length of the work roll by moving the displacement detector mount in the axial direction of the work roll;

constructing two roll profile measuring systems from a combination of two sets of displacement detectors arranged at a center distance $L_a+L_b$ and a center distance $L_b$, respectively, by the use of the set of the three displacement detectors; and when determining the roll profile of the work roll by processing, selectively using either of the two profile measuring systems, which is unsusceptible to measurement noise, for components of each order of the roll profile.

5. A roll profile measuring method using a displacement detector mount provided movably in a reciprocating manner along an axial direction of a work roll, and a plurality of displacement detector sets arranged on the displacement detector mount for measuring irregularities in a plurality of fractions of a surface of the work roll in the axial direction of the work roll, each set including three displacement detectors spaced a predetermined distance apart from each other, comprising:

measuring irregularities in the fractions of the surface of the work roll by moving the displacement detector mount in the axial direction of the work roll;

carrying out second profile measurement for each set of the three displacement detectors to determine a plurality of fractional roll profiles, said second profile measurement comprising:

measuring surface irregularities of the work roll over the total length of the work roll by moving the displacement detector mount in the axial direction of the work roll;

constructing two roll profile measuring systems from a combination of two sets of displacement detectors arranged at a center distance $L_a+L_b$ and a center distance $L_b$, respectively, by the use of the set of the three displacement detectors; and when determining the roll profile of the work roll by processing, selectively using either of the two profile measuring systems, which is unsusceptible to measurement noise, for components of each order of the roll profile, a measured length of each of the fractional roll profiles being greater than the distance between the adjacent sets of three displacement detectors each in order that the plurality of fractional roll profiles overlap each other; and combining the plurality of fractional roll profiles by using overlaps of the plurality of fractional roll profiles to obtain a roll profile over the total length of the work roll.

6. A roll profile measuring method using a displacement detector mount provided movably in a reciprocating manner along an axial direction of a work roll, and a set of three displacement detectors arranged on the displacement detector mount at equal center distances $L_d$ for measuring surface irregularities in the axial direction of the work roll, comprising:

measuring irregularities in the surface of the work roll over the total length of the work roll by moving the displacement detector mount in the axial direction of the work roll;

weighing measured values at the set of three displacement detectors by use of a factor dependent on the center distance $L_d$ and adding the weighed measured values together to obtain a data stream of composite measured values relating to the derivative of second order of the profile of the work roll;

multiplying the data stream of composite measured values by a factor dependent on a sampling pitch for measuring the surface irregularities of the work roll, and subjecting the data stream of composite measured values multiplied by the factor to numerical integration once to obtain a new data stream of composite measured values relating to the derivative of first order of the profile of the work roll; and processing the new data stream of composite measured values to determine the profile of the work roll.

7. A roll profile measuring method using a displacement detector mount provided movably in a reciprocating manner along an axial direction of a work roll, and a plurality of displacement detector sets arranged on the displacement detector mount for measuring irregularities in a plurality of fractions of a surface of the work roll in the axial direction of the work roll, each set including three displacement detectors spaced an equal distance apart from each other, comprising:

measuring irregularities in the fractions of the surface of the work roll by moving the displacement detector mount in the axial direction of the work roll;

carrying out third profile measurement for each set of the three displacement detectors to determine a plurality of fractional roll profiles, said third profile measurement comprising:

measuring irregularities in the surface of the work roll over the total length of the work roll by moving the displacement detector mount in the axial direction of the work roll;

weighing measured values at the set of three displacement detectors by use of a factor dependent on the center distance $L_d$ and adding the weighed measured values together to obtain a data stream of composite measured values relating to the derivative of second order of the profile of the work roll;

multiplying the data stream of composite measured values by a factor dependent on a sampling pitch for measuring the surface irregularities of the work roll, and subjecting the data stream of composite measured values multiplied by the factor to numerical integration once to obtain a new data stream of composite measured values relating to the derivative of first order of the profile of the work roll; and processing the new data stream of composite measured values to determine the profile of the work roll, a measured length of each of the fractional roll profiles being greater than the distance between the adjacent sets of three displacement detectors each in order that the plurality of fractional roll profiles overlap each other; and combining the plurality of fractional roll profiles by using overlaps of the plurality of fractional roll profiles to obtain a roll profile over the total length of the work roll.

8. A roll profile measuring method, comprising:

providing a mount movably in an axial direction of a work roll;

bearing a first displacement detector, a second displacement detector, and a third displacement detector on the mount at predetermined center distances in the axial direction of the work roll;

measuring data on irregularities in the axial direction of the work roll, including the effect of a translational motion error and a pitching motion error during the movement of the mount, by the first, second and third displacement detectors by moving the mount in the axial direction of the work roll;

with a combination of the first and second displacement detectors being used as a first displacement detector set, and a combination of the first and third displacement detectors being used as a second displacement detector set, processing two sets of data on irregularities in the axial direction of the work roll, including the effect of the pitching motion error during the movement of the mount, on the basis of the data on irregularities in the axial direction of the work roll corresponding to the first and second displacement detector sets;

calculating the pitching motion error during the movement of the mount on the basis of a shape defined by the two sets of irregularity data in the axial direction of the work roll;

correcting the irregularity data in the axial direction of the work roll, provided by the three displacement detectors, by using the pitching motion error to obtain a stream of irregularity data in the axial direction of the work roll free from the effect of the pitching motion error; and determining the irregularities in the axial direction of the work roll on the basis of the stream of irregularity data.

* * * * *